(12) United States Patent
Lindley et al.

(10) Patent No.: US 12,030,721 B2
(45) Date of Patent: Jul. 9, 2024

(54) STORAGE AND ORDER PICKING SYSTEM AND METHOD FOR PICKING ORDERED ARTICLES FROM A HANGING BAG AND ANOTHER LOAD AID

(71) Applicant: TGW Logistics Group GmbH, Marchtrenk (AT)

(72) Inventors: Timothy Lindley, Schwerte (DE); Gerald Kettlgruber, Linz (AT); Christian Ahammer, Gunskirchen (AT); Harald Johannes Schroepf, Wels (AT)

(73) Assignee: TGW Logistics Group GmbH, Marchtrenk (AT)

( * ) Notice: Subject to any disclaimer, the term of this patent is extended or adjusted under 35 U.S.C. 154(b) by 710 days.

(21) Appl. No.: 16/973,244

(22) PCT Filed: Jun. 19, 2019

(86) PCT No.: PCT/AT2019/060203
§ 371 (c)(1),
(2) Date: Dec. 8, 2020

(87) PCT Pub. No.: WO2019/241816
PCT Pub. Date: Dec. 26, 2019

(65) Prior Publication Data
US 2021/0237977 A1    Aug. 5, 2021

(30) Foreign Application Priority Data
Jun. 21, 2018    (AT) .............................. A 50514/2018

(51) Int. Cl.
*G06F 7/00*      (2006.01)
*B65G 1/137*     (2006.01)
(Continued)

(52) U.S. Cl.
CPC ......... *B65G 1/1378* (2013.01); *B65G 1/1375* (2013.01); *B65G 1/1376* (2013.01); *B66F 9/063* (2013.01); *G06Q 10/087* (2013.01)

(58) Field of Classification Search
CPC .. B65G 1/1378; B65G 1/1375; B65G 1/1376; B66F 9/063; G06Q 10/087
(Continued)

(56) References Cited

U.S. PATENT DOCUMENTS 5,720,157 A    2/1998  Ross
6,580,046 B1   6/2003  Koini et al.
(Continued)

FOREIGN PATENT DOCUMENTS

AT    516 612 B1    7/2016
AT    520517 A4     5/2019
(Continued)

OTHER PUBLICATIONS

International Search Report in PCT/AT2019/060203, mailed Nov. 12, 2019.
(Continued)

*Primary Examiner* — Yolanda R Cumbess
(74) *Attorney, Agent, or Firm* — Collard & Roe, P.C.

(57) ABSTRACT

The invention relates to a storage and order-picking system (1a ... 1f) as well as order-picking method for picking ordered goods into or onto a target loading aid (4, 4'), in which at least one of the picking orders comprises multiple order lines (6, 7), which specify (an) ordered good(s) (2, 3) according to its/their type of good (8) and its/their number of pieces to be picked (9). During the execution of a picking order, a first loading aid (11, 11a ... 11c), which is configured so as to be different from a hanging bag, with ordered good(s) (2) of the first order line (6) is out-fed from a first storage zone (10). Further, a hanging bag (13) with
(Continued)

ordered good(s) (3) of the second order line (7) is out-fed from a second storage zone (12). Then, the ordered good(s) (2) of the first order line (6) and the ordered good(s) (3) of the second order line (7) are loaded into or onto a target loading aid (4, 4') in accordance with the at least one picking order.

34 Claims, 8 Drawing Sheets

(51) Int. Cl.
*B66F 9/06* (2006.01)
*G06Q 10/087* (2023.01)

(58) Field of Classification Search
USPC ......... 700/213–214, 216, 219–220, 228, 230
See application file for complete search history.

(56) References Cited

U.S. PATENT DOCUMENTS

| | | | |
|---|---|---|---|
| 7,084,769 | B2 | 8/2006 | Bauer et al. |
| 8,170,712 | B2 | 5/2012 | Battles et al. |
| 8,538,578 | B2 | 9/2013 | Battles et al. |
| 8,583,490 | B2* | 11/2013 | Klementowicz, III ........... G06Q 50/12 235/382 |
| 9,014,843 | B2 | 4/2015 | Winkler |
| 9,205,982 | B2 | 12/2015 | Winkler |
| 9,421,580 | B2 | 8/2016 | Hansl et al. |
| 9,760,086 | B2 | 9/2017 | Woodtli et al. |
| 9,828,182 | B2 | 11/2017 | Schoenenberger |
| 9,975,699 | B2 | 5/2018 | Yamashita |
| 9,988,212 | B2 | 6/2018 | Yamashita |
| 10,083,406 | B2 | 9/2018 | Hance et al. |
| 10,252,861 | B2 | 4/2019 | Mathi et al. |
| 10,252,862 | B2 | 4/2019 | Mathi et al. |
| 10,354,221 | B2 | 7/2019 | Winkler |
| 10,427,873 | B1 | 10/2019 | Mause et al. |
| 10,710,802 | B2 | 7/2020 | Grosse et al. |
| 11,453,555 | B2 | 9/2022 | Lindley et al. |
| 2008/0056864 | A1 | 3/2008 | Wada et al. |
| 2008/0270327 | A1 | 10/2008 | Freudelsperger |
| 2009/0136328 | A1* | 5/2009 | Schafer ............ B65G 1/1378 414/807 |
| 2010/0049635 | A1* | 2/2010 | Delaney .............. G06Q 10/08 705/28 |
| 2012/0097064 | A1 | 4/2012 | Küssner |
| 2012/0213617 | A1 | 8/2012 | Winkler |
| 2014/0100769 | A1 | 4/2014 | Wurman et al. |
| 2017/0291767 | A1* | 10/2017 | Shields .................. G07G 1/14 |
| 2018/0025460 | A1 | 1/2018 | Watanabe et al. |
| 2018/0137459 | A1 | 5/2018 | Jacobs et al. |
| 2018/0194556 | A1 | 7/2018 | Lert, Jr. et al. |
| 2018/0251303 | A1 | 9/2018 | Mathi et al. |
| 2019/0047787 | A1 | 2/2019 | Fosnight et al. |
| 2019/0108604 | A1* | 4/2019 | Friedl .................... B65G 1/16 |
| 2019/0177086 | A1 | 6/2019 | Mathi et al. |
| 2020/0024074 | A1 | 1/2020 | Herzog-Lang et al. |
| 2021/0395012 | A1 | 12/2021 | Liu et al. |
| 2022/0374836 | A1 | 11/2022 | Miyamoto et al. |

FOREIGN PATENT DOCUMENTS

| | | |
|---|---|---|
| AU | 1998071492 A1 | 11/1998 |
| AU | 2012207033 A1 | 2/2013 |
| CA | 3 096 726 A1 | 10/2019 |
| CN | 101134528 A | 3/2008 |
| CN | 101957904 A | 1/2011 |
| CN | 103738646 A | 4/2014 |
| CN | 103764523 A | 4/2014 |
| CN | 104169197 A | 11/2014 |
| CN | 105392719 A | 3/2016 |
| CN | 105473469 A | 4/2016 |
| CN | 106815698 A | 6/2017 |
| CN | 107408285 A | 11/2017 |
| CN | 207434315 U | 6/2018 |
| DE | 20 2009 009 774 U1 | 9/2009 |
| DE | 10 2010 010 433 A1 | 9/2011 |
| DE | 10 2011 104 511 B3 | 10/2012 |
| DE | 10 2011 103 194 A1 | 12/2012 |
| DE | 10 2011 106 667 A1 | 1/2013 |
| DE | 10 2011 116 081 B3 | 4/2013 |
| DE | 10 2013 101 659 A1 | 8/2013 |
| DE | 10 2013 103 869 A1 | 10/2014 |
| DE | 10 2014 111 396 A1 | 2/2016 |
| DE | 10 2014 115 579 A1 | 4/2016 |
| DE | 20 2015 003 612 U1 | 8/2016 |
| DE | 20 2017 106 993 U1 | 12/2017 |
| DE | 20 2017 100 206 U1 | 4/2018 |
| EP | 0 798 239 A2 | 10/1997 |
| EP | 2 354 047 A1 | 8/2011 |
| EP | 2467319 B1 | 6/2012 |
| EP | 2 581 329 B1 | 7/2014 |
| EP | 2 769 936 A1 | 8/2014 |
| EP | 2 964 549 B1 | 9/2016 |
| EP | 2 766 285 B1 | 4/2017 |
| EP | 3 110 726 B1 | 4/2020 |
| EP | 3 575 246 B1 | 12/2022 |
| JP | 2001253515 A | 9/2001 |
| WO | 2006/029433 A1 | 3/2006 |
| WO | 2012/163780 A1 | 12/2012 |
| WO | 2013/004712 A1 | 1/2013 |
| WO | 2016/033628 A1 | 3/2016 |
| WO | 2017/027896 A1 | 2/2017 |
| WO | 2017/027897 A1 | 2/2017 |
| WO | 2017/100170 A1 | 6/2017 |
| WO | 2017/190168 A1 | 11/2017 |
| WO | 2017/214652 A1 | 12/2017 |
| WO | 2018/092015 A1 | 5/2018 |

OTHER PUBLICATIONS

International Search Report in PCT/AT2019/060241, mailed Dec. 6, 2019.
International Search Report in PCT/AT2019/060204, mailed Oct. 24, 2019.
International Search Report in PCT/AT2019/060202, mailed Oct. 24, 2019.
Link to YouTube-Video from KNAPP AG "How to shop your elephant": https://www.youtube.com/watch?v=nU9UV8z3ap0, 72 pages, downloaded Nov. 10, 2020.
SSI Carrier, The highly dynamic pocket sorter system for e-commerce and omnichannel, 10 pages, with English translation, downloaded Nov. 20, 2020.
SSI Schaefer, SSI Carrier: Das hochdynamische Taschensorter—System fuer E-Commerce und Omnichannel, https://www.youtube.com/watch?v=ASYRjuTOJ-U, 50 pages, downloaded Nov. 17, 2020.
"Flat goods and goods on hangers for store delivery and eCommerce, Stockmann", published by SSI Schaefer Group on Jan. 30, 2018, available at: https://www.youtube.com/watch?v=5U0TDpt1WAU.
"Overhead Conveying System, Fashion Logistics, eCommerce, Order Mail, Returns Processing, Loxxess AG", published by SSI Schaefer Group on Feb. 20, 2015 available at: https://www.youtube.com/watch?v=bl7X9MiiuWA.
"E-commerce solution with pocket sorter and robot workstation", Online article published by Telematic Markt.De on May 22, 2014 with translation.
"Hautnah fashion solutions", brochure published by Knapp AG in May 2014 and distributed at Knapp AG exhibition stand during CeMat trade fair in May 2014 with translation and description of relevant portion.
Photograph of Knapp AG exhibition stand at CeMat trade fair in May 2014 with description.

(56) References Cited

OTHER PUBLICATIONS

Opposition to European Patent EP 3810530 dated Mar. 7, 2024 with translation.

* cited by examiner

STORAGE AND ORDER PICKING SYSTEM AND METHOD FOR PICKING ORDERED ARTICLES FROM A HANGING BAG AND ANOTHER LOAD AID

CROSS REFERENCE TO RELATED APPLICATIONS

This application is the National Stage of PCT/AT2019/060203 filed on Jun. 19, 2019, which claims priority under 35 U.S.C. § 119 of Austrian Application No. A 50514/2018 filed on Jun. 21, 2018, the disclosure of which is incorporated by reference. The international application under PCT article 21(2) was not published in English.

BACKGROUND OF THE INVENTION

1. Field of the Invention

The invention relates to a storage and order-picking system for picking ordered goods into or onto a target loading aid. The storage and order-picking system comprises an order-processing computer for receiving orders for picking ordered goods and for ascertaining the ordered goods required for an order, wherein at least one of the orders comprises a first order line and a second order line, the first order line specifying a first ordered good to be picked and a quantity (number of pieces) of the first ordered good to be picked and the second order line specifying a second ordered good to be picked and a quantity (number of pieces) of the second ordered good to be picked. Further, the storage and order-picking system comprises a first storage zone for a plurality of first loading aids, which are configured so as to be different from a hanging bag, wherein an ordered good corresponding to the first order line is stored in or on a first loading aid of the plurality of loading aids.

The invention furthermore relates to an order-picking method for picking ordered goods into or onto a target loading aid, in which
  an order for picking ordered goods is acquired and the ordered goods required for this order are ascertained, wherein at least one of the orders comprises a first order line and a second order line, the first order line specifying a first ordered good to be picked and a quantity (number of pieces) of the first ordered good to be picked and the second order line specifying a second ordered good to be picked and a quantity (number of pieces) of the second ordered good to be picked, and in which
  a first loading aid, which is configured so as to be different from a hanging bag, storing the ordered good of the first order line is retrieved from a first storage zone, in which the first loading aid is stored.

2. Description of the Related Art

A storage and order-picking system and an order-picking method for picking ordered goods into or onto a target loading aid of the mentioned kind are known, in principle. For example, DE 10 2013 101 659 A1 discloses, in this context, a plant and a method for provisioning and order-picking articles in a storage system having a supply store for articles, a workstation in a first working area, as well as a workstation and a buffer store in the second working area. In the plant, picking orders are acquired, and groups of articles are ascertained based on the combination of different article properties for the articles required for the handling of the picking orders. Furthermore, a comparative analysis of the turnover rates between the groups of articles is carried out. Based on the comparison of the turnover rates, the articles are classified into fast-moving groups of articles and slow-moving groups of articles. The articles of the fast-moving groups of articles required for the handling of picking orders are interim-stored in the buffer store. The provisioning of the articles of a slow-moving group of articles at the workstation is done in such a way that the articles are transported from the supply store to the workstation, whereas the articles of a fast-moving group of articles are retrieved from the buffer store and transported to provision locations at the workstation. Afterwards, the picking process takes place at the workstations.

While DE 10 2013 101 659 A1 differentiates between fast-moving articles and slow-moving articles, the storage and order-picking system disclosed therein is structurally not optimally adjusted to this.

BRIEF SUMMARY OF THE INVENTION

It is therefore an object of the invention to specify an improved storage and order-picking system and an improved order-picking method. In particular, an improved adjustment for fast-moving articles and slow-moving articles and/or new goods and return goods is to be achieved.

The object of the invention is achieved with a storage and order-picking system of the kind mentioned at the beginning, additionally comprising
  a second storage zone for a plurality of second loading aids, which are configured as hanging bags, wherein an ordered good corresponding to the second order line is stored in a hanging bag of the plurality of hanging bags,
  a first conveying system for retrieving the first loading aid with the ordered good of the first order line from the first storage zone,
  a second conveying system for retrieving the hanging bag with the ordered good of the second order line from the second storage zone, and
  a picking station configured to pick the ordered good of the first order line and the ordered good of the second order line and to load the ordered good of the first order line and the ordered good of the second order line into or onto a target loading aid provided at the picking station.

The object of the invention is also achieved with an order-picking method of the kind mentioned at the beginning, in which
  a second loading aid, which is configured as a hanging bag storing an ordered good of the second order line is retrieved from a second storage zone, in which the hanging bag is stored, and in which
  the ordered good of the first order line and the ordered good of the second order line are loaded into or onto a target loading aid in accordance with the order.

In particular, the ordered good of the first order line and the ordered good of the second order line are conveyed to a picking station and afterwards, in accordance with the order, loaded into or onto a target loading aid provided at the picking station. To that end, the first and the second conveying systems may be coupled to the picking station, or the first or the second conveying system. In the latter case, a reloading station may be provided upstream of the picking station.

Advantageously, an improved adjustment for fast-moving articles and slow-moving articles and/or new goods and return goods can be achieved in this way. Here, structurally different loading aids which are well-adapted to the respective task are used. Specifically, at least one picking order is executed with the help of said loading aids.

The storing of the goods in the respectively optimally-adapted storage systems results in higher picking performances than is the case in the prior art. This results also in lower costs per picking process and thus a more favorable operation than in the prior art. The possibility of single-item access in the second storage zone results furthermore in an improved management of return goods.

Here, the steps of the specified method may run in an automatic and/or automated manner. In particular, all steps of the specified method may run in an automatic and/or automated manner.

In a "storage and order-picking system" goods may be delivered and taken over for example at a goods-in area and thereafter be repacked, if applicable, and stored in a warehouse. The goods may also be picked in accordance with an order, i.e. be retrieved from the warehouse, compiled into an order and provisioned for outbound transport at the goods-out area. As opposed to a manufacturing process, the goods are not changed substantially between the goods-in area and the goods-out area. Yet a slight change in shape is possible, in particular in case of non-rigid bodies, such as pouches or bags, or in case of other yielding packaging made, for example, of cardboard or plastic.

"Goods" are generally objects of the trade in goods and are delivered at the goods acceptance zone and discharged to a customer at the goods transfer zone in accordance with an order. Goods which are allocated to an order are referred to within the scope of the invention as "ordered goods." The allocation to an order can be done for goods already in storage or, in principle, even before. Within the scope of the invention, "(a) good(s)" or "(an) ordered good(s)" is/are understood to mean in particular an individually-manipulatable object and/or an individually-manipulatable group of objects. It should generally be noted that (a) "good(s)" and (an) "ordered good(s)" may be one and the same object at different points in time.

A "type of good" states the kind of (a) good(s). For example, "tagliatelle, 1 kg" or "mineral water 1 l" may be provided as the type of good. The type of good may in particular also comprise items of clothing. For example, "shirt, white, size 42" or "jeans, size 34/34" or "sock, black, size 43" may be provided as the type of good.

An "order line" specifies an ordered good to be picked and a quantity (number of pieces) of ordered good to be picked. For example, an order line may contain: "1 piece, tagliatelle, 1 kg" or "10 pieces, mineral water 1l." The ordered goods may in principle be of different kinds and in particular also comprise items of clothing. For example, an order line may therefore also contain: "1 piece, "shirt, white, size 42" or "3 pieces, jeans, size 34/34" or "10 pieces, sock, black, size 43."

An "order for picking ordered goods" ("picking order" in short) within the scope of the invention comprises multiple order lines, whose allocated ordered goods are stored in different storage zones. For example, socks may be stored in a first storage zone in first loading aids, which are configured as containers. Shirts, in contrast, may be ordered goods being stored in a second storage zone in second loading aids, which are configured as hanging bags. Ordered goods of the first order line thus form a first order part, ordered goods of the second order line a second order part. In picking operation, also orders comprising one single order line can be acquired and processed. In this case, the ordered good(s) is/are retrieved from one of the various storage zones.

An "order-processing computer" serves to receive an order and execute same. In particular, the order-processing computer is for this purpose connected to elements of the storage and order-picking system.

Within the scope of the invention, "order-picking" is to be understood to mean the compilation of ordered goods for a picking order, in the narrower sense the loading of a target loading aid with the ordered good of the first order line and/or the ordered good of the second order line.

"Slow-moving goods" are goods/ordered goods with a low rate of turnover and/or ordered goods which appear statistically less frequently in orders (picking orders) and are therefore not requested as often as fast-moving consumer goods.

"Fast-moving goods" are goods/ordered goods with a high rate of turnover and/or ordered goods which appear statistically frequently in orders (picking orders).

"Article-specific" means that the goods or ordered goods stored in a loading aid are the same type of good. For example, a first loading aid contains the good(s)/ordered good(s) "A" and a second loading aid contains the good(s)/ordered good(s) "B" etc. On the other hand, the loading aids may be subdivided into multiple receiving compartments by separating walls and receive different types of goods, wherein (a) good(s)/ordered good(s) "A" may be received in the first receiving compartment and (a) good(s)/ordered good(s) "B" may be received in the second receiving compartment. In contrast, the goods or ordered goods stored in a storage zone or in a loading aid in a "mixed" or "non-article-specific" manner, are different types of goods.

A "storage location" is an area in the storage and order-picking system in which (a) good(s) can be stored. A "storage zone" is an area in the storage and order-picking system which has a plurality of storage locations for storing the goods. For example, the storage zone may be configured as a fixed-installation or mobile storage rack which provisions a plurality of storage locations next to one another and above one another. Yet it is also conceivable that the storage zone is an area at the floor of the storage and order-picking system, which is provided and/or reserved for depositing and storing (a) good(s). Walk and travel zones are therefore not storage zones but can adjoin to same.

The "first storage zone" serves to store the first loading aids. In particular, only first loading aids, and no hanging bags, are stored there. For example, the first storage zone may be formed by shelf units and/or or by other holding spaces for the first loading aids, in particular by holding spaces at the floor. Automated conveying vehicles may be provided in the first storage zone for storing and retrieving first loading aids.

The "second storage zone" serves to store the hanging bags. In particular, only hanging bags, and no first loading aids, are stored there. For example, the second storage zone may be formed by overhead storage conveyors.

A "goods transfer zone" is to be understood to mean that region in which ordered goods are discharged from the storage and order-picking system, i.e. in particular a goods-out area.

A "goods acceptance zone" is to be understood to mean that area in which goods are introduced into the storage and order-picking system, i.e. in particular a goods-in area. In particular, goods carriers (e.g. pallets, cardboard boxes, etc.) which have been delivered can be separated in a manual or automated manner. This procedure is also referred to as "depalletizing."

A "target loading aid" serves to receive the ordered goods during the picking process and may in particular be configured as a container, cardboard box, tray, pallet, bag (in particular a "polybag"), pouch, sack, hanging bag, suspended carrier or shelf unit. The target loading aid may in particular function as a "dispatch loading aid" and serve to transport ordered goods out of the storage and order-picking system. Yet the target loading aid may also function as an "interim loading aid", in which ordered goods that have been picked and are intended for dispatching are interim-stored before being reloaded into a dispatch loading aid.

A "first loading aid, different from a hanging bag (and, if applicable, from a suspended carrier)" serves to transport goods and/or ordered goods of the first order line and/or of the first storage zone and has in particular one or multiple of the following properties:

- A first loading aid is stored in the first storage zone standing upright or lying down and transported by the first conveying system standing upright or lying down. Yet it would also be conceivable, in principle, that a container-shaped loading aid is transported suspended from an edge on container walls.
- A first loading aid in the operating position has a width, depth and height, wherein the following condition is fulfilled:

$width+depth>2\cdot height.$

- A first loading aid is configured as a container, cardboard box, tray, pallet or shelf unit.
- A first loading aid has a rigid bottom and/or rigid walls with an elastic modulus >100 MPa.
- A transport surface, at which the first loading aid is in contact with the first storage zone or with the first conveying system, in the operating position of the first loading aid is arranged below the latter's receiving plane and/or loading plane.
- A first loading aid has no hook and is thus hookless and/or hook-free.

It should be noted in this context that not all first loading aids must have the same properties, but first loading aids may also be configured differently. In addition, first loading aids may have multiple receiving zones/receiving compartments.

A second loading aid configured as a hanging bag has in particular one or multiple of the following properties:

- A hanging bag is stored in the second storage zone in a suspended manner and is transported by the second conveying system in a suspended manner.
- A hanging bag in a suspended state (operating position) has a width, depth and height, wherein the following condition is fulfilled:

$width+depth <2\cdot height.$

- A hanging bag has a bottom and/or walls made of flexible material, preferably of a textile (textile fabric) or a foil (plastic foil).
- A supporting surface, at which the hanging bag is in contact with the second storage zone or with the second conveying system, has a hook shape or bracket shape.
- A supporting surface, at which the hanging bag is in contact with the second storage zone or with the second conveying system, is configured roller-shaped and connected with a hook or arm of the hanging bag.
- A supporting surface, at which the hanging bag is in contact with the second storage zone or with the second conveying system, is arranged, in the operating position of the hanging bag, above the bag's filling plane.

In particular, a hanging bag comprises a front wall, a rear wall, a bottom, a storing space limited by the front wall, the rear wall and the bottom and a loading opening and/or unloading opening configured at the hanging bag at a first side and limited by the front wall, the rear wall and the bottom. The hanging bag may at a second side also have a side wall stop, against which the good(s) and/or the ordered good(s) of the second order line can be applied. In particular, the front wall, the rear wall and the bottom may be formed as a single piece, for example by a length of fabric or woven cloth, which is mounted at an overhead conveyor/suspension rod at its upper end and forms a loop in the bottom area. In a closed position, the front wall and the rear wall have only a small distance from each other, whereby the loading opening and unloading opening has a small surface area and the storing space of the hanging bag has a small volume. In the case of a length of fabric or woven cloth, its upper ends equally have only a small distance from each other, and the loop formed by the length of fabric or woven cloth is narrow. In the closed position, the good(s) and/or the ordered good(s) of the second order line can thus be stored and transported in a narrow space. In an open position, in contrast, the front wall and the rear wall have a large distance from each other, whereby the loading opening and unloading opening has a large surface area and the storing space of the hanging bag has a large volume. In the case of a length of fabric or woven cloth, its upper ends equally have a large distance from each other, and the loop formed by the length of fabric or woven cloth is wide. In the open position, the hanging bag is thus easy to load and unload. Such a hanging bag is disclosed, for example, in the German utility model DE 20 2017 106 993 U1, DE 20 2017 100 206 U1 or the Austrian patent application A 50320/2018.

It should also be noted in this context that not all hanging bags must have the same properties, but hanging bags may also be configured differently. In addition, hanging bags may have multiple storing zones/storing compartments. It should be noted in addition that it is not necessarily the case that only hanging bags are conveyed and/or stored on the second conveying system and only hanging bags are conveyed and/or stored in the second storage zone. For example, also "suspended carriers" for hanging articles (e.g. coat hangers) may be conveyed and stored there. These suspended carriers do not necessarily comprise a hanging bag, yet they may be arranged on the exterior or on the interior of the hanging bag. Such combined, second loading aids, which comprise both a hanging bag and means for suspending a coat hanger, or even the coat hanger itself, can be used particularly universally. Therefore, different second loading aids can be stored and transported in the second storage zone and by the second conveying system, in particular both hanging bags and suspended carriers for hanging goods (e.g. coat hangers).

The "operating position" of a first or second loading aid is characterized in that goods are storable in it and transportable using the conveying system.

The "first conveying system" is used to transport the first loading aids. The "second conveying system" is used to transport the second loading aids (=hanging bags). The "third conveying system" is used to transport the target loading aids.

The "first conveying system" and/or "second conveying system" and/or "third conveying system" may comprise (a) "fixed-installation conveying device(s)" and/or "autonomous conveying vehicles".

For the transport of goods, "(a) fixed-installation conveyor(s)" require(s) permanently-arranged devices. For example, a lift requires a frame at which a lifting platform is moved. In contrast to this, the lifting platform alone is non-functional. (A) fixed-installation conveying device(s)

is/are in particular characterized in that it/they cannot be extracted from the storage and order-picking system without loosening fastenings. (A) fixed-installation conveying device(s) is/are to be understood to mean, in particular, roller conveyors, belt conveyors, chain conveyors and suchlike. In contrast to this, an autonomous industrial truck can be extracted from the storage and order-picking system without loosening fastenings.

Within the scope of the invention, "automated conveying vehicles" are to be understood to mean self-propelled and/or driverless conveying vehicles for the transport of goods, which travel along permanently specified lanes or which are freely guided, i.e. without fixed track guidance. A fixed track guidance can be specified at the floor of the travel surface, for example with the help of optical color stripes, with magnetic strips, with marker tags or also with rails. An automated conveying vehicle has in particular a transport platform, on which the goods/ordered goods to be transported are received temporarily. Instead of the transport platform, or additionally to it, the automated conveying vehicle may also have a (telescopable) suspension rod and/or overhead conveyor for receiving hanging bags and, if applicable, suspended carriers. For example, the transport platform/suspension rod may be permanently affixed to the conveying vehicle, yet the transport platform/suspension rod may also be vertically and/or laterally movable relative to an underframe of the conveying vehicle, for example to be able to store goods/ordered goods into a storage rack and retrieve them from the storage rack. Wheels, of which at least one is driven, are arranged at the underframe. Further, an automated conveying vehicle also comprises an electronic control for receiving commands by a superordinate control and for controlling/regulating the movements of the automated conveying vehicle.

A "storage and retrieval unit" is an automated conveying vehicle which travels on rails and may be designed as a single-level storage and retrieval unit (also referred to as "shuttle") or as a multi-level storage and retrieval unit. For their operation, storage and retrieval units require elements of fixed-installation conveying device(s) (namely the rails). For this reason, storage and retrieval units are, within the scope of the invention, counted among fixed-installation conveying device(s).

An "autonomous industrial truck" is a non-rail guided automated conveying vehicle. At least one of the wheels is steerable, unless the autonomous conveying vehicle has wheels with which also a lateral movement can be executed (e.g. Mecanum wheels). An autonomous industrial truck also comprises sensors for capturing the environment of the industrial truck and for spatial orientation.

A "picking station" is a station and/or a zone or location, at or in which ordered goods can be loaded into a target loading aid. The picking station may have a picking control for controlling the picking process of the ordered goods. Yet it would also be conceivable that the picking process is controlled, alternatively or additionally, by the order-processing computer.

A "reloading station" is a station and/or a zone or location, at or in which ordered goods can be reloaded from a first loading aid into a hanging bag or vice versa. The reloading station may have a reloading control for controlling the reloading process of the ordered goods. Yet it would also be conceivable that the reloading process is controlled, alternatively or additionally, by the order-processing computer.

A "storage reloading station" is a station and/or a zone or location between the first storage zone and the second storage zone, at or in which goods (without reference to an order) can be reloaded from a first loading aid into a hanging bag or vice versa. The reloading station may have a storage reloading control for controlling the reloading process of the ordered goods.

A reloading station, a picking station and a storage reloading station may respectively be configured for automatic, manual or mixed automatic/manual operation, wherein the manual operation may in particular be computer-aided. To that end, said stations may comprise various functional units, for example a robot, a tilting device for tilting a first loading aid at a provisioning position (e.g. for reasons of ergonomics), an unloading device for unloading a hanging bag and/or a device for opening and/or closing a hanging bag at a provisioning position.

Further, a functional unit may be an output unit (e.g. a display or a voice output unit), an input unit (e.g. a keyboard, a touch display or a voice input unit) and/or a capturing unit (e.g. a scanner). Any combination of said functional units is of course possible.

In automatic or mixed automatic/manual operation, the robot and/or the tilting device can be instructed to execute a particular sequence of movements. In manual or mixed automatic/manual operation, a worker can be instructed with the help of the output unit to execute a particular process. The worker can offer feedback via the input unit and/or the capture unit. The above-mentioned process is therefore done in a computer-aided manual manner. Said functional units may be controlled by a control of the respective station, i.e. by the reloading control of the reloading station, the picking control of the picking station or the storage reloading control of the storage reloading station. Yet it would also be conceivable that said functional units are controlled, alternatively or additionally, by the order-processing computer.

In "automatic" operation, e.g. a robot independently executes specified sequences of movement. In "automated operation," a device can work, fully or partially, without human assistance. "Automated" operation may accordingly be automatic and/or computer-aided manual operation. In "computer-aided manual" operation, a worker receives instructions from a control and, if applicable, offers feedback to the control. In "mixed manual/automatic" operation, parts of a process are executed automatically (e.g. by a robot), other parts by a worker (e.g. in a computer-aided manual manner).

A "provisioning position" is generally a position at which a first loading aid, a hanging bag, or a target loading aid is supplied and/or provisioned. At this position, a loading and/or unloading of the respective loading aid is possible. For example, the provisioning position may be formed by a stopping position for a first loading aid on a first conveying system, by a stopping position for a hanging bag on a second conveying system or by a stopping position for a target loading aid on a third conveying system.

An "order-picking provisioning position" is therefore a provisioning position which is arranged at a picking station and/or forms part of same. A "reloading provisioning position" is therefore a provisioning position which is arranged at a reloading station and/or forms part of same. A "storage reloading provisioning position" is therefore a provisioning position which is arranged at a storage reloading station and/or forms part of same.

A "goods supply store" is a storage zone in which predominantly or exclusively new goods are stored. "(A) new good(s)" is/are (a) good(s) which has/have not yet been dispatched and is/are available for an order.

A "return goods store" is a storage zone in which predominantly or exclusively return goods are stored. "(A)

return good(s)" is/are goods which has/have already been dispatched but are/were sent back by the recipient and is/are available for a new order.

A "mobile shelf unit" is a movable shelf unit which is not fixed at a particular location. A mobile shelf unit may in particular comprise wheels for easier transport.

An "overhead conveyor" is a conveyor at which hanging bags can be stored and/or transported suspended. A "storage overhead conveyor" is therefore an overhead conveyor at which hanging bags can be stored suspended and which is in particular arranged in the second storage zone. A "transport overhead conveyor" is an overhead conveyor via which hanging bags can be transported suspended. A "mobile storage overhead conveyor" is a movable overhead conveyor which is not fixed at a particular location. A mobile storage overhead conveyor may in particular be structured similarly to a mobile shelf unit and equally have wheels for easier transport. If the supporting surface, at which the hanging bag is in contact with the overhead conveyor, is configured hook-shaped or bracket-shaped, the hook or bracket of the hanging bag glides along the overhead conveyor during transport. If the supporting surface, at which the hanging bag is in contact with the overhead conveyor, is configured roller-shaped, the roller of the hanging bag rolls along the overhead conveyor during transport. The same is true for suspended carriers.

A "sorting device" is a device with which first and/or second ordered goods can be brought into a specified or specifiable sequence.

Advantageous designs and further advancements of the invention result from the sub-claims as well as from the description in combination with the figures.

In particular, the at least one picking station may have a first order-picking provisioning position, to which the first conveying system is coupled in order to provision the first loading aid with the ordered good of the first order line, and have a second order-picking provisioning position, to which the second conveying system is coupled in order to provision the hanging bag with the ordered good of the second order line. This means that the first conveying system and the second conveying system lead to the picking station separately.

It is also favorable if the first and second conveying systems are joined at a joining point, at which the first conveying system ends in the second conveying system or the second conveying system ends in the first conveying system. In this way, the storage and order-picking system may be structured in a particularly compact manner, in particular in the area of the goods retrieval and/or order-picking.

In this case, the picking station may have at least one first order-picking provisioning position, to which the first conveying system is coupled in order to provision a first loading aid of the first loading aids with the ordered good of the first order line and a second loading aid of the first loading aids with the ordered good of the second order line. In this case, only the first conveying system leads toward the picking station.

Yet it is also conceivable that the picking station has at least one second order-picking provisioning position, to which the second conveying system is coupled in order to provision a first hanging bag of the hanging bags with the ordered good of the second order line and a second hanging bag of the hanging bags with the ordered good of the first order line. In this case, only the second conveying system leads toward the picking station.

It is advantageous for the storage and order-picking system
 a) to have a reloading station along the route of the first conveying system, which enables the reloading of the ordered good of the first order line into one of the second hanging bags of the hanging bags provisioned at the reloading station, and a picking station along the route of the second conveying system, which enables the loading of the ordered good of the first order line and the ordered good of the second order line into or onto a target loading aid provisioned there, or
 b) to have a reloading station along the route of the second conveying system, which enables the reloading of the ordered good of the second order line into or onto a second loading aid of the first loading aids provisioned at the reloading station, and a picking station along the route of the first conveying system, which enables the loading of the ordered good of the first order line and the ordered good of the second order line into or onto a target loading aid provisioned there.

Accordingly,
 a) the hanging bag with the ordered good of the second order line is conveyed to a picking station, the first loading aid with the ordered good of the first order line is conveyed to a reloading station, the ordered good of the first order line is afterwards loaded into a second hanging bag of the hanging bags provisioned there, the second hanging bag of the hanging bags with the ordered good of the first order line is conveyed to said picking station, and afterwards the ordered good of the first order line and the ordered good of the second order line are loaded into or onto a target loading aid provisioned there, or
 b) the first loading aid with the ordered good of the first order line is conveyed to a picking station, the hanging bag with the ordered good of the second order line is conveyed to a reloading station, the ordered good of the second order line is afterwards loaded into or onto a second loading aid of the first loading aids provisioned there, the second loading aid of the first loading aids with the ordered good of the second order line is conveyed to said picking station, and afterwards the ordered good of the first order line and the ordered good of the second order line are loaded into or onto a target loading aid provisioned there.

Due to the fact that the reloading station is arranged, in the conveyance flow, upstream of the picking station, only first loading aids (case b) or only hanging bags (case a) are supplied at the picking station. This harmonizes and simplifies the picking process.

In the above context, it is in addition of advantage if, in the case a),
 the picking station has at least one second order-picking provisioning position, to which the second conveying system is coupled in order to provision a first hanging bag of the hanging bags with the ordered good of the second order line and a second hanging bag of the hanging bags with the ordered good of the first order line, and
 the reloading station has a first reloading provisioning position, to which the first conveying system is coupled in order to provision the first loading aid with the ordered good of the first order line from the first storage zone, and
 the reloading station has a second reloading provisioning position, to which the second conveying system is coupled in order to provision the second hanging bag of the hanging bags and in order to enable the reloading of the ordered good of the first order line into the second hanging bag of the hanging bags, or, in the case b), the picking station has at least one first order-picking provisioning position, to which the first conveying system is coupled in order to provision a first loading aid of the first loading aids with the ordered good of the first order line and a second loading aid of the first loading aids with the ordered good of the second order line, and the reloading station has a first reloading provisioning position, to which the second conveying system is coupled in order to provision the hanging bag storing the ordered good of the second order line from the second storage zone, and the reloading station has a second reloading provisioning position, to which the first conveying system is coupled in order to provision the second loading aid of the first loading aids and in order to enable the reloading of the ordered good of the second order line into the second loading aid of the first loading aids.

It is also favorable if the storage and order-picking system has a third conveying system, which is coupled to the picking station and enable(s) a provisioning of the target loading aid at the picking station. In particular, it is of advantage here if the picking station has a third order-picking provisioning position, to which the third conveying system is coupled in order to provision the target loading aid and in order to enable the reloading of the ordered good of the first order line and the ordered good of the second order line into or onto the target loading aid in accordance with a picking order (in the course of the picking process). In this way, the automatic transport of the target loading aid to and from the picking station is possible.

Furthermore, it is of advantage for the storage and order-picking system
i) to comprise a first picking station along the route of the first conveying system, which enables the reloading of the ordered good of the first order line into or onto a target loading aid in the first picking station provisioned at the first picking station and transported by a third conveying system, and a second picking station along the route of the second and third conveying systems, which enables the loading of the ordered good of the second order line into or onto said target loading aid, or
ii) to comprise a first picking station along the route of the second conveying system, which enables the reloading of the ordered good of the second order line into or onto a target loading aid provisioned at the first picking station and transported by a third conveying system, and a second picking station along the route of the first and third conveying systems, which enables the loading of the ordered good of the first order line into or onto said target loading aid.

Accordingly,
i) the first loading aid with the ordered good of the first order line is conveyed to a first picking station, the ordered good of the first order line is afterwards loaded into or onto a target loading aid provided at the first picking station, the target loading aid with the ordered good of the first order line and the hanging bag with the ordered good of the second order line are conveyed to a second picking station and afterwards the ordered good of the second order line is loaded into or onto said target loading aid, or ii) the hanging bag with the ordered good of the second order line is conveyed to a first picking station, the ordered good of the second order line is afterwards loaded into or onto a target loading aid provided at the first picking station, the target loading aid with the ordered good of the second order line and the first loading aid with the ordered good of the first order line are conveyed to a second picking station and afterwards the ordered good of the first order line is loaded into or onto said target loading aid.

In this way, order-picking stations may be provided which are optimally adapted to the respective loading aid, i.e. to the first loading aid or a hanging bag. This simplifies the picking process.

In the above context it is in addition of advantage if, in the case i),
the first picking station has a first order-picking provisioning position, to which the first conveying system is coupled in order to provision the first loading aid with the ordered good of the first order line, and
the second picking station has a second order-picking provisioning position, to which the second conveying system is coupled in order to provision the hanging bag with the ordered good of the second order line,
the first picking station has a third order-picking provisioning position, to which the third conveying system is coupled in order to provision the target loading aid and in order to enable the reloading of the ordered good of the first order line into or onto the target loading aid at the first picking station, and
the second picking station has a fourth order-picking provisioning position, to which the third conveying system is coupled in order to provision the target loading aid and in order to enable the reloading of the ordered good of the second order line into or onto the target loading aid at the second picking station, and that, in the case ii),
the second picking station has a first order-picking provisioning position, to which the first conveying system is coupled in order to provision the first loading aid with the ordered good of the first order line, and
the first picking station has a second order-picking provisioning position, to which the second conveying system is coupled in order to provision the hanging bag with the ordered good of the second order line,
the second picking station has a third order-picking provisioning position, to which the third conveying system is coupled in order to provision the target loading aid and in order to enable the reloading of the ordered good of the first order line into or onto the target loading aid at the second picking station, and
the first picking station has a fourth order-picking provisioning position, to which the third conveying system is coupled in order to provision the target loading aid and in order to enable the reloading of the ordered good of the second order line into or onto the target loading aid provided at the first picking station.

It is also of advantage if the first conveying system and the second conveying system connect the first storage zone and the second storage zone with each other and a storage reloading station is arranged along the route of the first conveying system and the second conveying system, which storage reloading station enables the reloading of
A) a good from the first storage zone into a hanging bag provided at the storage reloading station, and/or
B) a good from the second storage zone into or onto a first loading aid provided at the storage reloading station.

Accordingly,

A) a first loading aid with a good from the first storage zone is retrieved and conveyed to a storage reloading station, afterwards the good is loaded into a hanging bag provisioned there and the hanging bag is conveyed into the second storage zone and stored there, or B) a hanging bag with a good from the second storage zone is retrieved and conveyed to a storage reloading station, afterwards the good is loaded into or onto a first loading aid provisioned there and the first loading aid is conveyed into the first storage zone and stored there.

These measures therefore enable goods to be rearranged between the two storage zones. This ensures that for example a utilization of a storage zone can be adapted to the current need. It is in particular conceivable that fast-moving goods are transferred to the second storage zone and/or slow-moving goods are transferred to the first storage zone. This can be advantageous for example for seasonal goods, e.g. for summer and winter clothing. Accordingly, in early spring, summer clothing can be stored from the first storage zone into the second storage zone and winter clothing from the second storage zone into the first storage zone. In early fall, the reverse process will be triggered.

In the above context it is in addition of advantage if the storage reloading station, in the case A), has a first storage reloading provisioning position, to which the first conveying system is coupled in order to provision the first loading aid with the good from the first storage zone, and a second storage reloading provisioning position, to which the second conveying system is coupled in order to provision the hanging bag and in order to enable the reloading of the good from the first storage zone into the hanging bag, and, in the case B), has a second storage reloading provisioning position, to which the second conveying system is coupled in order to provision the hanging bag with the good from the second storage zone, and a first storage reloading provisioning position, to which the first conveying system is coupled in order to provision the first loading aid and in order to enable the reloading of the good from the second storage zone into the first loading aid.

It is particularly advantageous if predominantly or exclusively new goods are stored in the first storage zone (and the first storage zone comprises a goods supply store or is configured as same), and/or predominantly or exclusively slow-moving goods are stored in the first storage zone, and/or goods in the first storage zone are stored in a first loading aid in an article-specific manner.

New goods usually occur in larger numbers of pieces. In view of this, it is of advantage to store multiple of these goods in or on a first loading aid in a space-saving manner. Accordingly, it is also of advantage if multiple ordered goods of at least one first order line are received in a first loading aid. Yet it would of course also be conceivable that exactly one ordered good of a first order line is received in a first loading aid. New goods also usually occur in an article-specific manner. In view of this, it is of advantage to store goods in or on a first loading aid in an article-specific manner. Accordingly, it is also of advantage if multiple ordered goods of the same type of good of at least one first order line are received in a first loading aid.

In additional embodiments, predominantly or exclusively return goods are stored in the second storage zone (and the second storage zone comprises a return goods store), and/or predominantly or exclusively fast-moving goods are stored in the second storage zone, and/or goods in the second storage zone are stored in a hanging bag in a mixed (i.e. non-article-specific) manner.

Return goods very often occur as separate goods. In view of this, it is of advantage to store these goods in a hanging bag in a space-saving manner. Accordingly, it is also of advantage if exactly one ordered good of a second order line is received in a hanging bag. Yet it would of course also be conceivable that multiple ordered goods of at least one second order line are received in a hanging bag. Return goods also usually occur in a mixed (non-article-specific) manner. In view of this, it is of advantage to store goods in the hanging bag in a mixed manner. Accordingly, it is also of advantage if multiple ordered goods of different types of good of at least one second order line are received in a hanging bag.

It is favorable if the first loading aid is selected from the group: container, tray or cardboard box, wherein the loading aid comprises a bottom with a receiving location on its upper side, onto which at least one good/ordered good of the first order line, preferably a plurality of goods/ordered goods of the first order line, can be placed, and has a transport surface on its lower side, by which the loading aid is transportable by the first conveying system, as well as comprises side walls rising up from the bottom. This enables the first loading aid to receive in particular multiple goods or ordered goods.

It is favorable if the storage and order-picking system has a sorting device cooperating with at least one of the first conveying system and the second conveying system, the sorting device being configured to bring at least one of the ordered goods of the first order line and the ordered goods of the second order line into a specifiable sequence. In this way, the picking process can be simplified. In particular, a sorting operation can take place in a single-stage or also multi-stage manner. The sorting device may be configured as a matrix sorter, for example. In addition to a sorting device, or instead of a sorting device, a sorting operation may also take place by an adequate removal of the ordered good of the first order lines from the first storage zone and/or ordered good of the second order lines from the second storage zone, for example with the help of an automated conveying vehicle (for example with the help of a storage and retrieval unit or with the help of an autonomous industrial truck).

Generally, the first conveying system and/or second conveying system may comprise (a) fixed-installation conveying device(s) and/or autonomous industrial trucks. This enables the transport of the ordered good of the first order line and the ordered good of the second order line to be done in a flexible manner.

It is favorable if the first storage zone comprises storage racks, storage locations are provided in the storage racks, and the first conveying system comprises an automated conveying vehicle, which enables the retrieving of the first loading aid with the ordered good of the first order line.

In this way, a plurality of goods and/or ordered good of the first order line can be stored in the first storage zone in a space-saving manner.

It is further favorable if the first conveying system comprises a first conveying section for retrieving the first loading aid with the ordered good of the first order line from the first storage zone, and a second conveying section for storing a first loading aid with one or more goods into the first storage zone, and the automated conveying vehicle also enables the storing of the first loading aid with the one or more goods into a storage location.

This enables goods to be stored into the first storage zone and ordered good of the first order line to be retrieved from the first storage zone. To that end, also a joint conveying section, instead of separate conveying sections, may be provided, which joint conveying section is operated bidirectionally.

It is further favorable if the automated conveying vehicle is displaceable in front of the storage locations along a rack aisle, and is equipped with a load handing device for transporting a first loading aid with one or more goods into a storage location and/or for transporting the first loading aid with the ordered good of the first order line from a storage location, and is configured as a rail guided storage and retrieval unit or as an autonomous industrial truck.

The proposed measures ensure that the goods can be stored in an automated manner and/or the ordered goods of first order lines can be retrieved in an automated manner.

It is particularly advantageous if the shelf units are configured as mobile shelf units which function as first loading aids, and the automated conveying vehicle is configured as an autonomous industrial truck and the mobile shelf units are transportable by the autonomous industrial truck.

In addition, it is favorable if the first loading aid configured as a mobile shelf unit comprises shelves with respectively at least one receiving location in storage planes located on top of one another, onto which at least one good/ordered good of at least one first order line, preferably a plurality of goods/ordered goods of at least one first order line, can be placed. In this way, a plurality of ordered goods of the first order line can be transported at once. The number of journeys needed for a picking order can thus be kept low.

It is further favorable if the second storage zone comprises overhead storage conveyors and I) the second conveying system comprises overhead transport conveyors connected to the overhead storage conveyors and enable the retrieving of the hanging bag with the ordered good of the second order line, and/or II) the second conveying system comprises an automated conveying vehicle, which enables the retrieving of the hanging bag with the ordered good of the second order line.

The proposed measures ensure that the one or more goods can be stored in an automated manner and/or the ordered good of the second order line can be retrieved in an automated manner. In the case I), fixed-installation conveying device(s) is/are provided to that end, in the case II), non-fixed-installation conveying device(s) is/are provided to that end.

It is further favorable if the second conveying system comprises a first conveying section for retrieving the hanging bag with the ordered good of the second order line from the second storage zone and a second conveying section for storing a hanging bag with one or more goods into the second storage zone, and in the case I) the overhead transport conveyors and in the case II) the automated conveying vehicle also enables the storing of the hanging bag with the one or more goods into an overhead storage conveyor.

This enables goods to be stored into the second storage zone and ordered good of the second order line to be retrieved from the second storage zone. To that end, also a joint conveying section, instead of separate conveying sections, may be provided, which joint conveying section is operated bidirectionally.

It is also favorable if, in the case II), the automated conveying vehicle is displaceable in front of the storage locations along a rack aisle, and is equipped with a load handling device for transporting a hanging bag with the one or more goods into the overhead storage conveyor and/or for transporting the hanging bag with the ordered good of the second order line from the overhead storage conveyor, and is configured as a rail guided storage and retrieval unit or as an autonomous industrial truck.

The proposed measures ensure that the one or more goods can be stored into the second storage zone in an automated manner and/or the ordered good of the second order line can be retrieved from the second storage zone in an automated manner.

It is also particularly advantageous if the overhead storage conveyors are configured so as to be mobile and/or transportable, and the automated conveying vehicle, in the case II), is configured as an autonomous industrial truck and a mobile overhead storage conveyor is transportable by the autonomous industrial truck.

In this way, a plurality of ordered goods of the second order line can be transported at once. The number of journeys needed for a picking order can thus be kept low. A mobile and/or transportable overhead storage conveyor is in particular formed by a suspension rod, which can be manipulated by the autonomous industrial truck.

It is particularly advantageous if the autonomous industrial truck is configured both for transporting the mobile shelf units and for transporting the mobile overhead storage conveyors. For example, the autonomous industrial truck may, to that end, have a transport platform. The first and second conveying systems are, in this case, (at least partially) configured identical and the autonomous industrial trucks can thus be used in a particularly flexible manner. A joining point for the first and second conveying systems may in particular be formed by a location of the stationary conveying devices (e.g. roller conveyor for first loading aids or overhead conveyor for second loading aids), from which location first loading aids or second loading aids are loaded onto autonomous industrial trucks of the above-mentioned kind, which can transport both first and second loading aids.

It is finally favorable if the target loading aid functions as a dispatch loading aid and the ordered good of the first order line and/or the ordered good of the second order line is/are loaded directly into or onto the dispatch loading aid, or functions as an interim loading aid and the ordered good of the first order line and/or the ordered good of the second order line are reloaded into or onto the interim loading aid and afterwards into or onto a dispatch loading aid.

The provision of an interim loading aid can facilitate the picking process, in particular when many different kinds of dispatch loading aids are loaded with ordered goods of the first order lines and ordered goods of the second order lines. The use of (uniform) interim loading aids ensures that the picking process at the picking station, i.e. the loading of the interim loading aid with ordered goods of the first order lines and ordered goods of the second order lines, can be harmonized and simplified. If orders are picked directly into a dispatch loading aid, the picking process is done without detours.

It should be noted in this context that the variants and advantages disclosed in relation to the storage and order-picking system presented equally relate to the method presented, and vice versa.

BRIEF DESCRIPTION OF THE DRAWINGS

For the purpose of a better understanding of the invention, the latter will be elucidated in more detail by means of the figures below.

In a strongly simplified, schematic depiction, each figure shows as follows.

DETAILED DESCRIPTION OF THE INVENTION

First of all, it is to be noted that, in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, and these specifications of location are to be analogously transferred to the new position.

Figure 1:
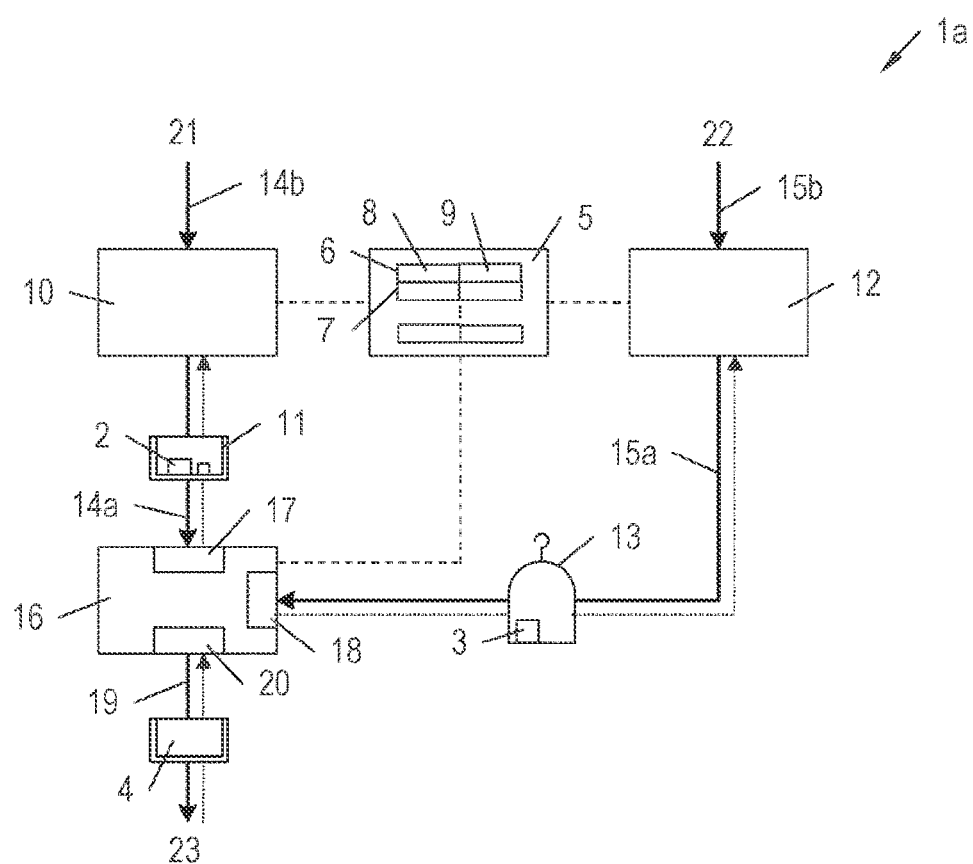
FIG. 1 a first embodiment of a schematically-depicted storage and order-picking system, in which the first and second conveying systems lead to a picking station.

FIG. 1 shows a storage and order-picking system 1a for picking ordered goods 2, 3 into or onto a target loading aid 4, which comprises an order-processing computer 5 for acquiring orders for picking ordered goods 2, 3 and for ascertaining the ordered goods 2, 3 required for an order. At least one of the orders comprises at least one first order line 6 and at least one second order line 7, wherein each order line 6, 7 specifies at least one ordered good 2, 3 according to its type of good 8 and its number of pieces to be picked 9.

The storage and order-picking system 1a further comprises a first storage zone 10 for first loading aids 11 and a second storage zone 12 for second loading aids 13. The first loading aids 11 are configured so as to be different from a hanging bag, and (an) ordered good(s) 2 of the first order line 6 is/are stored in or on one of the first loading aids 11. The second loading aids 13 are configured as hanging bags, and (an) ordered good(s) 3 of the second order line 7 is/are stored in one of the hanging bags 13.

Further, the storage and order-picking system 1a comprises a first conveying section 14a of the first conveying system for retrieving the first loading aid 11 with the ordered good(s) 2 of the first order line 6 from the first storage zone 10 and a first conveying section 15a of the second conveying system for retrieving the hanging bag 13 with the ordered good(s) 3 of the second order line 7 from the second storage zone 12.

Further, the storage and order-picking system 1a comprises a picking station 16, to which the first conveying section 14a of the first conveying system and the first conveying section 15a of the second conveying system are coupled, and which enable the loading of the ordered good(s) 2 of the first order line 6 and the ordered good(s) 3 of the second order line 7 into or onto a target loading aid 4 in the picking station 16.

To that end, the at least one picking station 16 has a first order-picking provisioning position 17, to which the first conveying section 14a of the first conveying system is coupled in order to provision the first loading aid 11 with the ordered good(s) 2 of the first order line 6, and a second order-picking provisioning position 18, to which the first conveying section 15a of the second conveying system is coupled in order to provision the hanging bag 13 with the ordered good(s) 3 of the second order line 7.

The storage and order-picking system 1a also comprises a third conveying system 19, which is coupled to the picking station 16 and enable(s) a provisioning of the target loading aid 4 at the picking station 16. Accordingly, the picking station 16 has a third order-picking provisioning position 20, to which the third conveying system 19 is coupled in order to provision the target loading aid 4 and in order to enable the reloading of the ordered good(s) 2 of the first order line 6 and the ordered good(s) 3 of the second order line 7 into or onto the target loading aid 4 in accordance with a picking order (in the course of the picking process).

Furthermore, the storage and order-picking system 1a comprises a first goods acceptance zone 21, which is coupled to the first storage zone 10 via a second conveying section 14b of the first conveying system and via which a first loading aid with (a) good(s) (not depicted) can be stored into the first storage zone 10. In the same way, the storage and order-picking system 1a comprises a second goods acceptance zone 22, which is coupled to the second storage zone 12 via a second conveying section 15b of the second conveying system and via which a hanging bag with (a) good(s) (not depicted) can be stored into the second storage zone 12. The first goods acceptance zone 21 and the second goods acceptance zone 22 may form part of a goods-in area, or form same.

Delivered goods carriers (e.g. pallets, cardboard boxes, etc.) can be stored directly into the first storage zone 10 and/or into the second storage zone 12. In this case, the delivered goods carriers directly form the first loading aids 11 and/or hanging bags 13. Alternatively the delivered goods may also be reloaded from the delivered goods carriers into first loading aids 11 and/or second loading aids which are configured as hanging bags 13 such that the first loading aids store ordered goods of a first order line of an order and the second loading aids contain ordered goods of a second order line of the order. This process can be done manually, in an automated manner or in a mixed operation. In particular, the delivered good(s) can be separated during this process.

The storage and order-picking system 1a also comprises a goods transfer zone 23, which is coupled to the third conveying system 19. The goods transfer zone 23 may form part of a goods-out area, or form same.

The first storage zone 10 may in particular comprise a goods supply store, or be configured as such. Accordingly, predominantly or exclusively new goods are delivered via the first goods acceptance zone 21 and subsequently stored in the first storage zone 10.

New goods often occur in larger numbers of pieces. In view of this, it is of advantage to store multiple of these goods in or on a first loading aid 11 in a space-saving manner. Accordingly, it is also of advantage if multiple ordered goods 2 of at least one first order line 6 are received in a first loading aid 11, as it is depicted in FIG. 1. Yet it would of course also be conceivable that exactly one ordered good 2 of a first order line 6 is received in a first loading aid 11. New goods also usually occur in an article-specific manner. In view of this, it is of advantage to store goods in or on a first loading aid 11 in an article-specific manner. Accordingly, it is also of advantage if multiple ordered goods 2 of the same type of good 8 of at least one first order line 6 are received in a first loading aid 11.

In an additional embodiment, the second storage zone 12 comprises a return goods store. In this embodiment, return goods are predominantly or exclusively delivered via the second goods acceptance zone 22 and subsequently stored in the second storage zone 12.

Return goods very often occur as separate goods. In view of this, it is of advantage to store this/these good(s) in a hanging bag 13 in a space-saving manner. Accordingly, it is also of advantage if exactly one ordered good 3 of a second order line 7 is received in a hanging bag 13, as it is depicted in FIG. 1. Yet it would of course also be conceivable that multiple ordered goods 3 of at least one second order line 7 are received in a hanging bag 13. Return goods usually also occur in a mixed (i.e. non-article-specific) manner. In view of this, it is of advantage to store goods in the hanging bag 13 in a mixed manner. Accordingly, it is also of advantage if multiple ordered goods 3 of different types of good 8 of at least one second order line 7 are received in a hanging bag 13.

It would also be conceivable that predominantly or exclusively slow-moving good(s) is/are stored in the first storage zone 10 and predominantly or exclusively fast-moving good(s) in the second storage zone 12.

It should be noted in this context that the first loading aid 11 may have multiple storing zones, for example multiple storing compartments, if the first loading aid 11 is configured as a container. The ordered goods 2 of the first order line 6 can be stored in these storing zones in an article-specific manner such that each storing zone of the first loading aid 11 contains only a single type of good of the ordered goods of the first order line 6, although, overall, ordered goods 2 of the first order line 6 of multiple types of good 8 are stored in the first loading aid 11. This is similarly true for the hanging bag 13. The latter, too, may have multiple storing zones/storing compartments, in which the ordered goods 3 of the second order line 7 are stored in an article-specific manner, although, overall, ordered goods 3 of the second order line 7 of multiple types of good 8 are stored in the hanging bag 13.

It should further be noted that the transport direction during the retrieving and/or picking of the ordered goods 2 of the first order line 6 and the ordered goods 3 of the second order line 7 is depicted in FIG. 1 using broad lines and arrows. A return conveying and/or return storing of empty or partially evacuated first loading aids 11, empty or partially evacuated hanging bags 13 and empty target loading aids 4 may be done in the opposite direction according to the transport direction depicted in a dotted manner. This return conveying and/or return storing may take place by bidirectional operation or by a circular design (in this context also see FIG. 9) of the first, second and third conveying systems. It is, of course, also conceivable that, after the full or partial evacuation, the first loading aids 11, hanging bags 13 and target loading aids 4 are transported elsewhere in the storage and order-picking system 1a and reintegrated into the flow of the picking process (not depicted). If the first loading aids 11 or hanging bags 13 are partially evacuated, they still contain (a) good(s) which was/were not required for the current picking order and can therefore be used for another picking order.

A control connection between the order-processing computer 5, of the first storage zone 10, the second storage zone 12 and the picking station 16 is indicated using dashed lines. The order-processing computer 5 can control the first storage zone 10, the second storage zone 12 and the picking station 16 via this control connection according to a picking order.

The function of the storage and order-picking system 1a depicted in FIG. 1 is as follows, wherein it is assumed that goods are already stored in the first storage zone 10 and in the second storage zone 12:

In a first step, an order for picking ordered goods 2, 3 is acquired, and the ordered goods required for this order 2, 3 are ascertained.

The order adduced for this example comprises multiple order lines 6, 7. Each order line 6, 7 specifies (an) ordered good(s) 2, 3 according to its/their type of good 8 and its/their number of pieces to be picked 9. For example, the type of good 8 in the first order line 6 may be "shirt, white, size 42," and the number of pieces to be picked may be "3 pieces." The second order line 7 may contain, as type of good 8, "tagliatelle, 1 kg" and the number of pieces 9 "1 piece."

In a second step, the first loading aid 11, on or in which an ordered good 2 of the first order line 6 for the at least one order (i.e. for example the three shirts) is stored, is retrieved from the first storage zone 10 and transported to the first order-picking provisioning position 17 via the first conveying section 14a of the first conveying system and supplied there.

Equally, the hanging bag 13, which contains (an) ordered good(s) 3 of the second order line 7 for the at least one order (i.e. for example the tagliatelle), is retrieved from the second storage zone 12 and transported to the second order-picking provisioning position 18 via the first conveying section 15a of the second conveying system and supplied there.

In a third step, the ordered good(s) 2 of the first order line 6 and the ordered good(s) 3 of the second order line 7 are loaded into or onto the target loading aid 4 in accordance with the picking order. Subsequently, the target loading aid 4 is transported to the goods transfer zone 23 by the third conveying system 19.

Here, it is advantageous if multiple ordered goods 2 of at least one first order line 6 are received in a first loading aid 11 and exactly one ordered good 3 of a second order line 7 is received in a hanging bag 13, as it is depicted in FIG. 1.

In the example presented, the target loading aid 4 functions as a dispatch loading aid and thus serves the outbound transport of the ordered good(s) 2 of the first order line 6 and the ordered good(s) 3 of the second order line 7 from the storage and order-picking system 1*a*. It would also be conceivable that the target loading aid 4 functions as an interim loading aid and accordingly serves the interim-storing of ordered good(s) 2 of the first order line 6, picked and intended for dispatching, and the ordered good(s) 3 of the second order line 7, before these are reloaded into a dispatch loading aid.

Generally, the target loading aid 4 may be configured in particular as a container, cardboard box, tray, pallet, bag (in particular a "polybag"), pouch, sack, hanging bag or shelf unit. In an entirely similar way, the first loading aid 11 may be configured in particular as a container, cardboard box, tray, pallet or shelf unit.

In particular, the first loading aid 11 comprises a bottom with a receiving location on its upper side, onto which at least one good/ordered good 2 of the first order line 6, preferably a plurality of goods/ordered goods 2 of the first order line 6, can be placed, and a transport surface on its lower side, by which the first loading aid 11 is transportable by a first conveying system 14*a*, 14*b*, as well as side walls rising up from the bottom.

Figure 8:
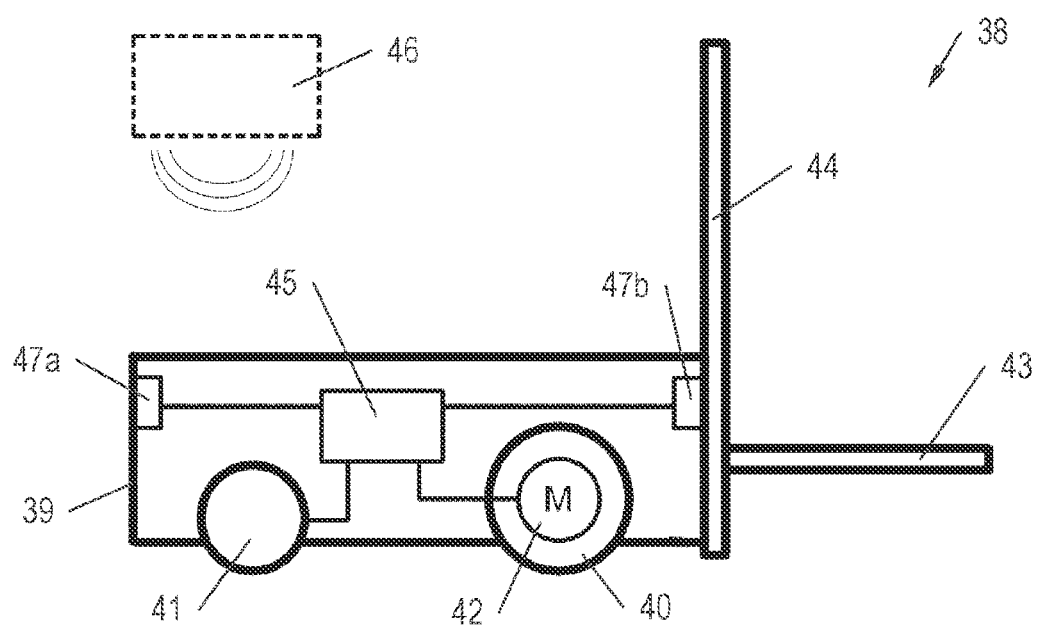
FIG. 8 an exemplary and schematically-depicted autonomous industrial truck.
Figure 9:
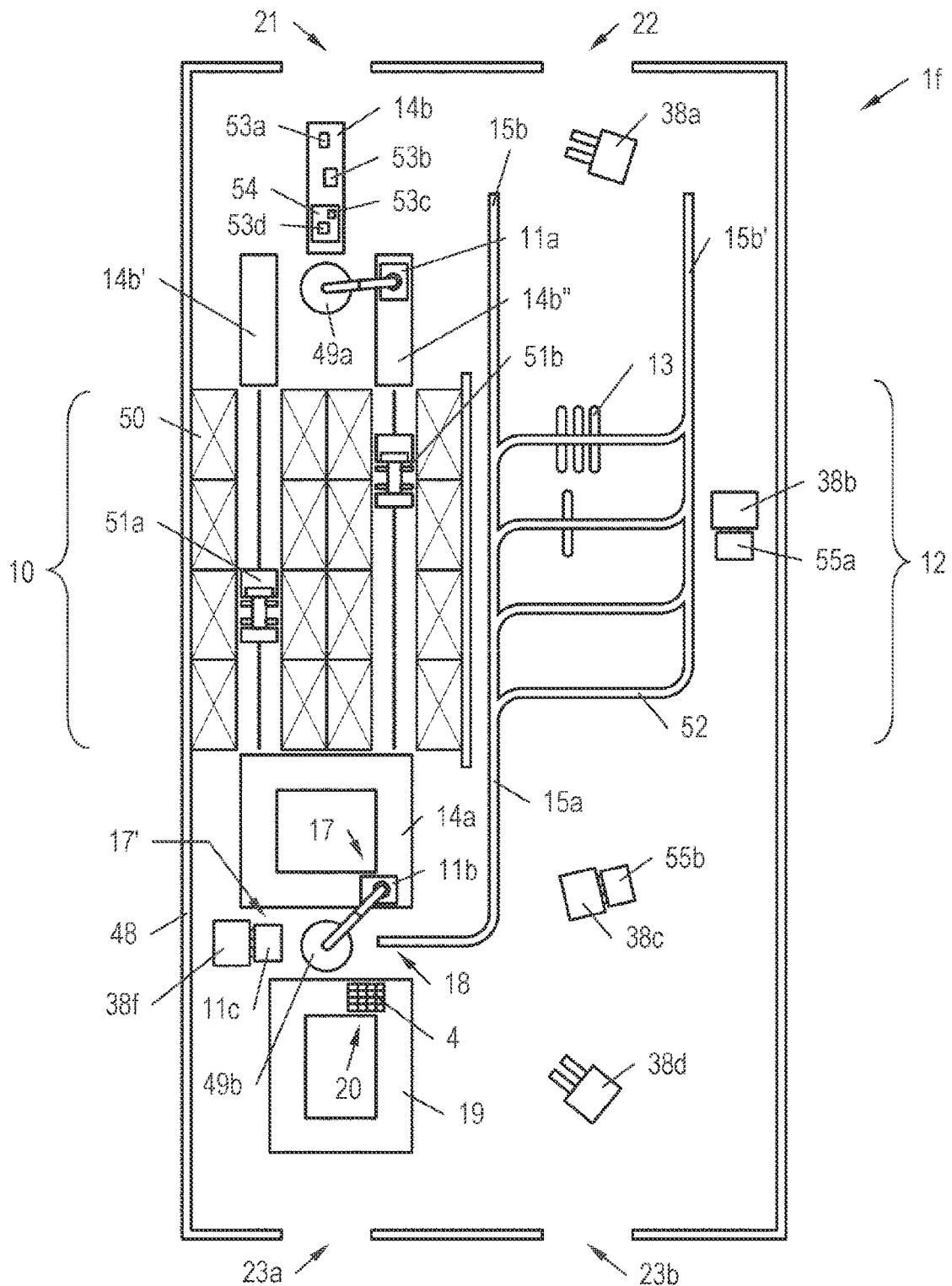
FIG. 9 a plan view onto an exemplary storage and order-picking system.

The first conveying system 14*a*, 14*b* and/or the second conveying system 15*a*, 15*b* and/or the third conveying system 19 may comprise (a) fixed-installation conveying device(s) and/or autonomous industrial trucks (see also FIGS. 8 and 9). Fixed-installation conveying devices are to be understood to mean, in particular, roller conveyors, belt conveyors or chain conveyors. Autonomous conveying vehicles are to be understood to mean, in particular, rail guided storage and retrieval units and non-rail guided autonomous industrial trucks.

Preferably, the first storage zone 10 comprises storage racks with storage locations. The first conveying system 14*a*, 14*b* then comprises preferably at least one automated conveying vehicle, which enables the retrieving of the first loading aid 11 with the ordered good(s) 2 of the first order line 6 and optionally also the storing of a first loading aid 11 with the good(s) into a storage location. Here, the automated conveying vehicle is displaceable in front of the storage locations along a rack aisle and equipped with a load handling device for storing a first loading aid 11 with (a) good(s) into a storage location and/or for retrieving the first loading aid 11 with the ordered good(s) 2 of the first order line 6 from a storage location. A possible embodiment of such a first storage zone 10 with storage locations and first conveying systems is known, for example, from WO 2016/033628 A1. In this case, the automated conveying vehicle may be configured as a rail guided storage and retrieval unit. On the other hand, the automated conveying vehicle may also be configured as an autonomous industrial truck (see also FIGS. 8 and 9). Autonomous industrial trucks are freely-traveling (non-rail guided) and can be used in a flexible manner. For example, one and the same autonomous industrial truck can be used for the first conveying system 14*a*, 14*b*, the second conveying system 15*a*, 15*b* and the third conveying system 19.

Figure 6:
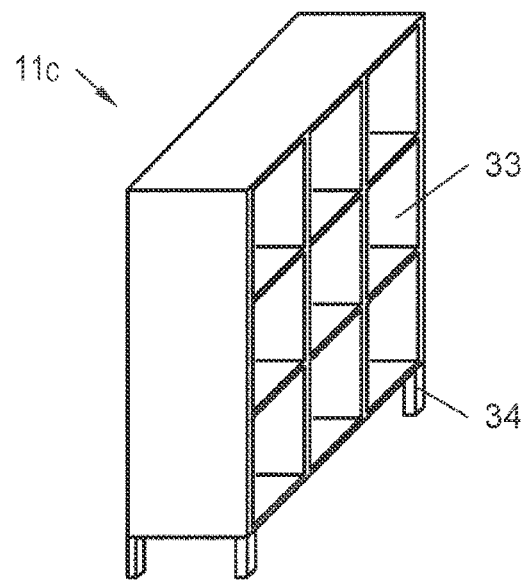
FIG. 6 an exemplary (mobile) shelf unit in an oblique view.

In a particular embodiment, the shelf units may be configured as mobile shelf units and function as first loading aids 11 (see also FIG. 6). Just like a shelf unit installed in a fixed manner, such a mobile shelf unit comprises shelves in storage planes located on top of one another with respectively at least one receiving location, onto which at least one good/ordered good 2 of at least one first order line 6, preferably a plurality of goods/ordered goods 2 of at least one first order line 6, can be placed. The automated conveying vehicle is, (at least) in the case of mobile shelf units, configured as an autonomous industrial truck and can transport the mobile shelf units. The first storage zone 10 is therefore in particular configured as a holding location for said mobile shelf units. It is, of course, also conceivable that the first storage zone 10 has both shelf units installed in a fixed manner and holding locations for mobile shelf units. Mobile shelf units may also have transport rollers in order to simplify their transport.

The second storage zone 12 comprises overhead storage conveyors, in which the hanging bags 13 are stored in a suspended manner Here, two variants are conceivable, in principle. In a case I), the second conveying system comprises 15*a*, 15*b* overhead transport conveyors, which are connected, in terms of conveyance, to the overhead storage conveyors and enable the retrieving of the hanging bag 13 with the ordered good(s) 3 of the second order line 7 and optionally also the storing of a hanging bag 13 with good(s) into an overhead storage conveyor. The overhead storage conveyors and the overhead transport conveyors are, in this case, designed in a fixed-installation manner and configured rail-shaped, for example (see also FIG. 9).

In a case II), the second conveying system 15*a*, 15*b* may also comprise an automated conveying vehicle, which enables the retrieving of the hanging bag 13 with the ordered good(s) 3 of the second order line 7 and optionally also the storing of a hanging bag 13 with good(s) into an overhead storage conveyor.

In the case II), again, the automated conveying vehicle is displaceable in front of the storage locations along a rack aisle and equipped with a load handling device for storing a hanging bag 13 with the good(s) into the overhead storage conveyor and/or for retrieving the hanging bag 13 with the ordered good(s) 3 of the second order line from the overhead storage conveyor. The automated conveying vehicle may, again, be configured as a rail guided storage and retrieval unit or as a (non-rail guided) autonomous industrial truck.

Figure 7:
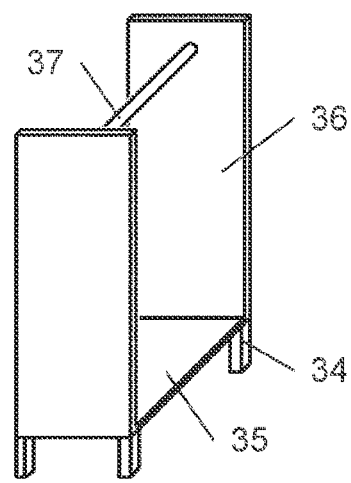
FIG. 7 an exemplary, mobile overhead storage conveyor in an oblique view.

In a particular embodiment, the overhead storage conveyors may be configured so as to be mobile and/or transportable (see also FIG. 7). The automated conveying vehicle is, (at least) in the case of mobile overhead storage conveyors, configured as an autonomous industrial truck and can transport the mobile overhead storage conveyors. The second storage zone 12 is therefore in particular configured as a holding location for said mobile overhead storage conveyors. It is, of course, also conceivable that the second storage zone 12 has both overhead storage conveyors arranged in a fixed-installation manner and holding locations for mobile overhead storage conveyors. Mobile overhead storage conveyors may also have transport rollers in order to simplify their transport.

In a particularly advantageous embodiment, the autonomous industrial truck is configured both for transporting the mobile shelf units and for transporting the mobile overhead storage conveyors. This variant may also be considered a special form of a joining point, at which the first conveying system 14*a* ends in the second conveying system 15*a* or the second conveying system 15*a* ends in the first conveying system 14*a*.

Figure 2:
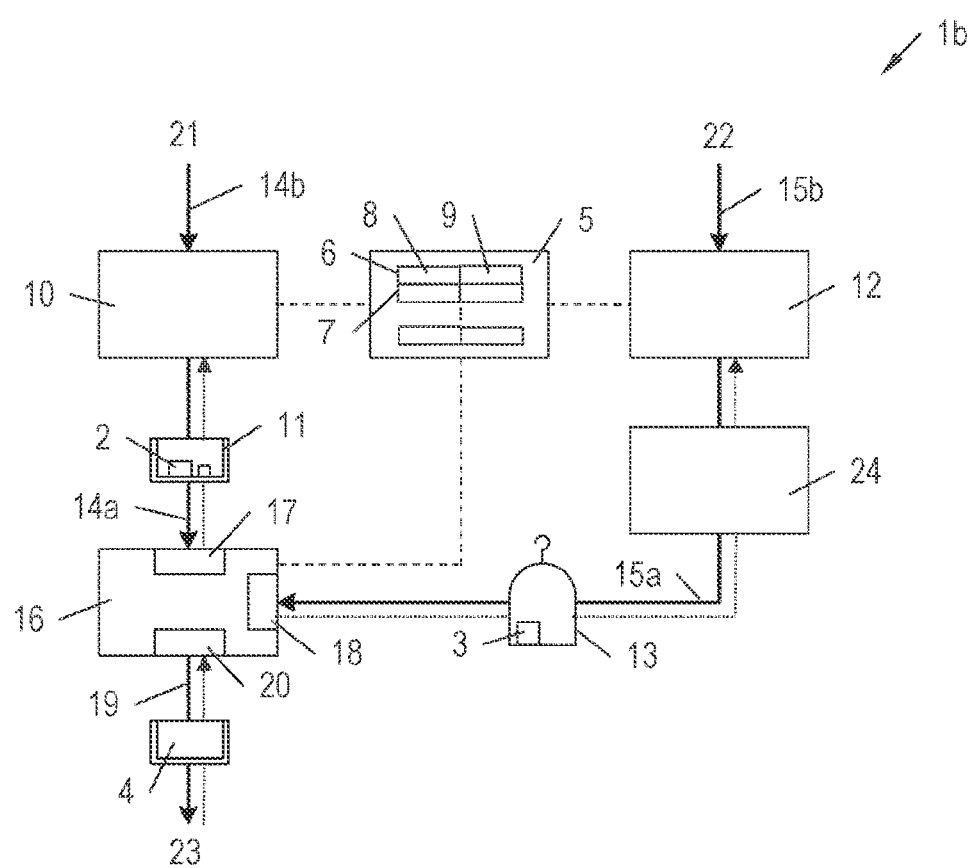
FIG. 2 a second embodiment of a schematically-depicted storage and order-picking system having a sorting device along the route of the second conveying system.

FIG. 2 shows a storage and order-picking system 1*b*, which is very similar to the storage and order-picking system 1*a* depicted in FIG. 1. In contrast to the latter, a single-stage or multi-stage sorting device 24 is arranged along the route of the first section 15*a* of the second conveying system in the storage and order-picking system 1*b*, which sorting device 24 may be configured as a matrix sorter, for example. With the help of the sorting device 24, the hanging bags 13 can be brought into a sequence requested at the second order-picking provisioning position 18, unless this sequence is created by an adequate retrieving from the second storage zone 12 anyway. In FIG. 2, merely one sorting device 24 is arranged along the route of the first section 15*a* of the second conveying system. It is, of course, also conceivable that, as an alternative or in addition to the sorting device 24 along the route of the first section 15*a* of the second conveying system, a sorting device 24 is arranged along the route of the first section 14*a* of the first conveying system.

Figure 3:
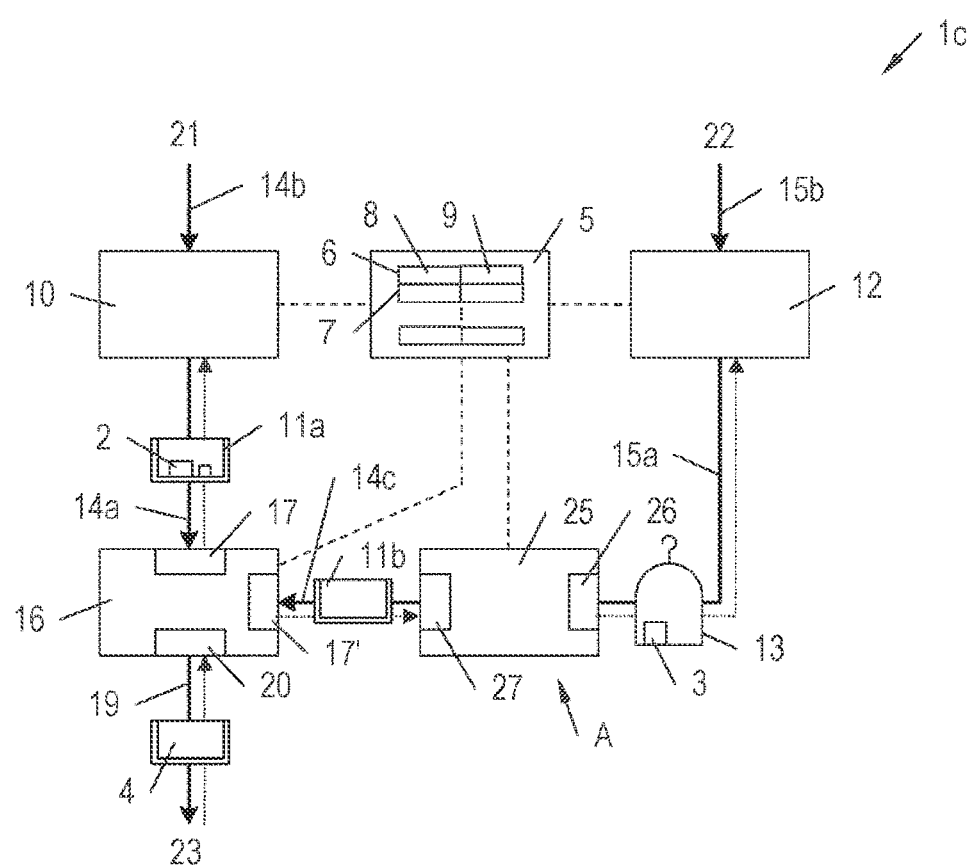
FIG. 3 another embodiment of a schematically-depicted storage and order-picking system having a reloading station along the route of the second conveying system.

FIG. 3 shows another storage and order-picking system 1*c*, which is very similar to the storage and order-picking system 1*a* depicted in FIG. 1. In contrast to this, the storage and order-picking system 1*c* discloses a reloading station 25 along the route of the first section 15*a* of the second conveying system, which enables the reloading of the ordered good(s) 3 of the second order line 7 into or onto a second loading aid 11*b* of the first loading aids provisioned at the reloading station 25, and a picking station 16 along the route of the first section 14*a* of the first conveying system, which enables the loading of the ordered good(s) 2 of the first order line 6 and the ordered good(s) 3 of the second order line 7 into or onto a target loading aid provisioned there 4 (case b).

To that end, the reloading station 25 comprises a first reloading provisioning position 26, to which the first section 15*a* of the second conveying system is coupled in order to provision the hanging bag 13 with the ordered good(s) 3 of the second order line 7 from the second storage zone 12. The reloading station 25 also comprises a second reloading provisioning position 27, to which a third section 14*c* of the first conveying system is coupled in order to provision the second loading aid 11*b* of the first loading aids and in order to enable the reloading of the ordered good(s) 3 of the second order line 7 into the second loading aid 11*b* of the first loading aids.

During the execution of a picking order, the first loading aid 11*a* of the first loading aids with the ordered good(s) 2 of the first order line 6 is conveyed to the picking station 16 and supplied at the first order-picking provisioning position 17. Further, the hanging bag 13 with the ordered good(s) 3 of the second order line 7 is conveyed to the reloading station 25 and supplied at the first reloading provisioning position 26. The ordered good(s) 3 of the second order line 7 is/are afterwards loaded into or onto the second loading aid 11*b* of the first loading aids, which is provisioned at the second reloading provisioning position 27. In particular, the ordered goods 3 of the second order lines 7 may be mixed in the second loading aid 11*b* of the first loading aids, even if the ordered goods 3 of the second order lines 7 are stored in the hanging bags 13, or in storing zones in the hanging bags 13, in an article-specific manner. Then, the second loading aid 11*a* of the first loading aids with the ordered good(s) 3 of the second order line 7 is conveyed to the picking station 16 and supplied at the other first order-picking provisioning position 17'. Finally, the ordered good(s) 2 of the first order line 6 and the ordered good(s) 3 of the second order line 7 are loaded into or onto the target loading aid 4, which is provisioned at the third order-picking provisioning position 20.

The reloading station 25 may be considered a joining point A, at which the second conveying system 15*a* ends in the first conveying system 14*c*. Accordingly, a first loading aid 11*a* of the first loading aids with the ordered good(s) 2 of the first order line 6 and a second loading aid 11*b* of the first loading aids with the ordered good(s) 3 of the second order line 7 are supplied at the picking station 16.

In the case b) described above, the reloading station 25 is arranged along the route of the first section 15*a* of the second conveying system. Yet a reversal of the situation would also be conceivable, i.e. an arrangement of the reloading station 25 along the route of the first section 14*a* of the first conveying system.

Accordingly, the reloading station 25, which enables the reloading of the ordered good(s) 2 of the first order line 6 into one of the second hanging bags 13 of the hanging bags provisioned at the reloading station 25, is arranged along the route of the first section 14*a* of the first conveying system (case a). The first reloading provisioning position 26, at which the first loading aid 11 with the ordered good(s) 2 of the first order line 6 is supplied from the first storage zone 10, would accordingly be coupled to the first section 14*a* of the first conveying system. The second reloading provisioning position 27, to which the second hanging bag 13 of the hanging bags for receiving the ordered good(s) 2 of the first order line 6 is supplied, would accordingly be coupled to a third section of the second conveying system. Accordingly, the first loading aid 11 with the ordered good(s) 2 of the first order line 6 would be conveyed to the reloading station 25, the ordered good(s) 2 of the first order line 6 would afterwards be loaded into a second hanging bag 13 of the hanging bags provisioned there, the second hanging bag 13 of the hanging bags with the ordered good(s) 2 of the first order line 6 would be conveyed to the picking station 16, and afterwards the ordered good(s) 2 of the first order line 6 and the ordered good(s) 3 of the second order line 7 would be loaded into or onto the target loading aid 4 provisioned there.

The reloading station 25 may in this case be considered a joining point A, at which the first conveying system 14*a* ends in the second conveying system. Accordingly, a first hanging bag 13 of the hanging bags with the ordered good(s) 3 of the second order line 7 and a second hanging bag 13 of the hanging bags with the ordered good(s) 2 of the first order line 6 are supplied at the picking station 16.

In particular, the ordered goods 2 of the first order lines 6 may be mixed in the second hanging bag 13 of the hanging bags, even if the ordered goods 2 of the first order lines 6 are stored in the loading aids 11, or in storing zones in the first loading aids 11, in an article-specific manner.

In the storage and order-picking system 1*c* depicted in FIG. 3, the first loading aid 11*a* of the first loading aids with the ordered good(s) 2 of the first order line 6 is supplied at the first order-picking provisioning position 17 and the second loading aid 11*b* of the first loading aids with the ordered good(s) 3 of the second order line 7 is supplied at the other first order-picking provisioning position 17'. There are therefore two separate first order-picking provisioning positions 17 and 17'. Yet it would, alternatively, also be conceivable that the first section 14*a* of the first conveying system and the third section 14*c* of the first conveying system are joined and accordingly only one first order-picking provisioning position 17 for the first loading aid 11*a* of the first loading aids with the ordered good(s) 2 of the first order line 6 and the second loading aid 11*b* of the first loading aids with the ordered good(s) 3 of the second order line 7 is provided.

Figure 4:
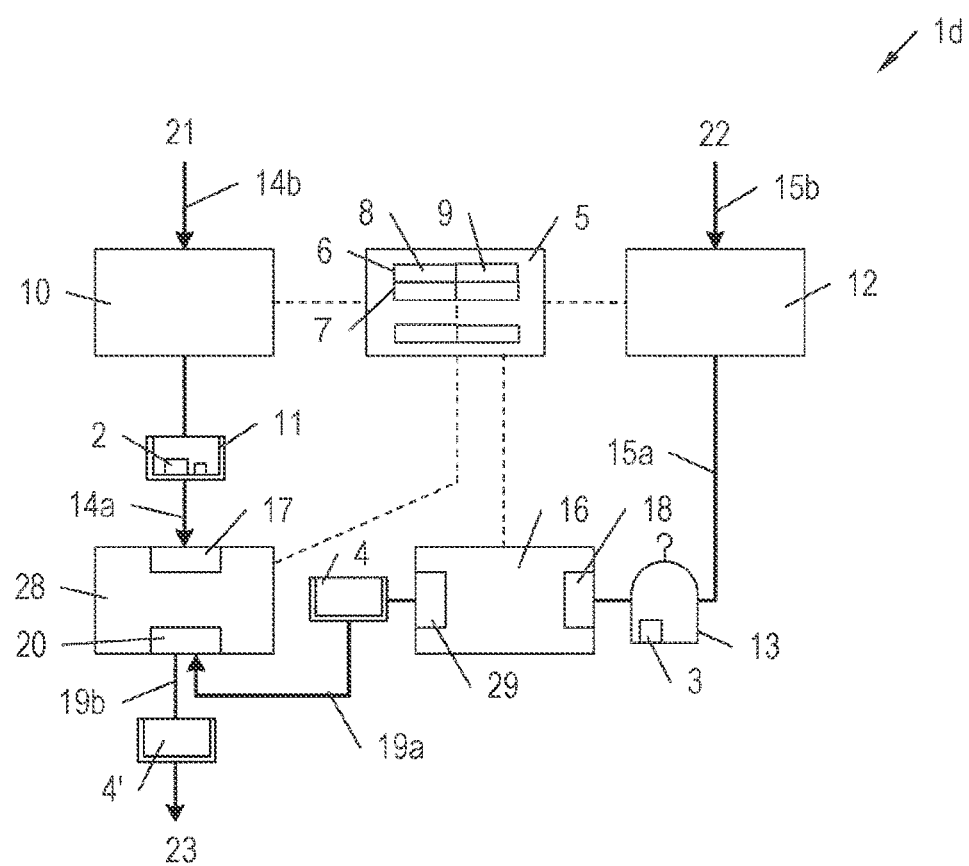
FIG. 4 another embodiment of a schematically-depicted storage and order-picking system having two order-picking stations.

FIG. 4 shows another storage and order-picking system 1*d*, which is very similar to the storage and order-picking system 1*a* depicted in FIG. 1. In contrast to the latter, the storage and order-picking system 1*d* has a first picking station 16 along the route of the first section 15*a* of the second conveying system, which enables the reloading of the ordered good(s) 3 of the second order line 7 into or onto a target loading aid 4, 4' provisioned at the first picking station 16 and transported via a first section 19*a* of the third conveying system. Here, the reference number 4 refers to the target loading aid in FIG. 4 at a first point in time and the reference number 4' refers to the same target loading aid at a second, later point in time. Further, the storage and order-picking system 1d comprises a second picking station 28 along the route of the first section 14a of the first conveying system and along the route of the first section 19a and the second section 19b of the third conveying system, which enables the loading of the ordered good(s) 2 of the first order line 6 into or onto said target loading aid 4, 4' (case ii).

To that end, the second picking station 28 has a first order-picking provisioning position 17, to which the first section 14a of the first conveying system is coupled in order to provision the first loading aid 11 with the ordered good(s) 2 of the first order line 6. The first picking station 16 comprises a second order-picking provisioning position 18, to which the first section 15a of the second conveying system is coupled in order to provision the hanging bag 13 with the ordered good(s) 3 of the second order line 7. The second picking station 28 furthermore comprises a third order-picking provisioning position 20, to which the first section 19a and the second section 19b of the third conveying system are coupled in order to provision the target loading aid 4, 4' and in order to enable the reloading of the ordered good(s) 2 of the first order line 6 into or onto the target loading aid 4, 4' at the second picking station 28.

Finally, the first picking station 16 comprises a fourth order-picking provisioning position 29, to which the first section 19a of the third conveying system is coupled in order to provision the target loading aid 4, 4' and in order to enable the reloading of the ordered good(s) 3 of the second order line 7 into or onto the target loading aid 4, 4' at the first picking station 16.

During the execution of a picking order, the hanging bag 13 with the ordered good(s) 3 of the second order line 7 is conveyed to the first picking station 16 and supplied at the second order-picking provisioning position 18. Afterwards, the ordered good(s) 3 of the second order line 7 is/are loaded into or onto the target loading aid 4, 4', which is provisioned at the fourth order-picking provisioning position 29. In particular, the ordered goods 3 of the second order lines 7 may be mixed in the target loading aid 4, 4', even if the ordered goods 3 of the second order lines 7 are stored in the hanging bags 13, or in storing zones in the hanging bags 13, in an article-specific manner. Then, the target loading aid 4, 4' with the ordered good(s) 3 of the second order line 7 is conveyed to the second picking station 28 and provisioned at the third order-picking provisioning position 20. Equally, the first loading aid 11 with the ordered good(s) 2 of the first order line 6 is conveyed to the second picking station 28 and provisioned at the first order-picking provisioning position 17. Then, the ordered good(s) 2 of the first order line 6 is/are loaded into or onto the target loading aid 4, 4' provisioned at the third order-picking provisioning position 20.

In the case ii) described above, the first picking station 16 is arranged along the route of the first section 15a of the second conveying system. Yet a reversal of the situation would also be conceivable, i.e. an arrangement of the first picking station 16 along the route of the first section 14a of the first conveying system.

Accordingly, the first picking station 16, which enables the reloading of the ordered good(s) 2 of the first order line 6 into or onto a target loading aid 4, 4' provisioned at the first picking station 16 and transported by a third conveying system 19a, would be arranged along the route of the first section 14a of the first conveying system and the second picking station 28, which enables the loading of the ordered good(s) 3 of the second order line 7 into or onto the target loading aid 4, 4', would be arranged along the route of the first section 15a of the second conveying system and along the route of the first section 19a and the second section 19b of the third conveying system (case i).

The first picking station 16 would, in this case, have a first order-picking provisioning position 17, to which the first section 14a of the first conveying system is coupled in order to provision the first loading aid 11 with the ordered good(s) 2 of the first order line 6. The second picking station 28 would accordingly comprise a second order-picking provisioning position 18, to which the first section 15a of the second conveying system is coupled in order to provision the hanging bag 13 with the ordered good(s) 3 of the second order line 7. The second picking station 28 would furthermore comprise a third order-picking provisioning position 20, to which the third conveying system is/are coupled in order to provision the target loading aid 4, 4' and in order to enable the reloading of the ordered good(s) 3 of the second order line 7 into or onto the target loading aid 4, 4' at the second picking station 28. Finally, the first picking station 16 would comprise a fourth order-picking provisioning position 29, to which the first section 19a of the third conveying system is coupled in order to provision the target loading aid 4, 4' and in order to enable the reloading of the ordered good(s) 2 of the first order line 6 into or onto the target loading aid 4, 4' at the first picking station 16.

During the execution of a picking order, the first loading aid 11 with the ordered good(s) 2 of the first order line 6 would be conveyed to the first picking station 16 and supplied at the first order-picking provisioning position 17. Then, the ordered good(s) 2 of the first order line 6 would be loaded into or onto the target loading aid 4, 4', which is supplied at the fourth order-picking provisioning position 29. The target loading aid 4, 4' with the ordered good(s) 2 of the first order line 6 would then be conveyed to the second picking station 28 and supplied at the third order-picking provisioning position 20. Further, the hanging bag 13 with the ordered good(s) 3 of the second order line 7 would be conveyed to the second picking station 28 and supplied at a second order-picking provisioning position 18. Then, the ordered good(s) 3 of the second order line 7 would be loaded into or onto the target loading aid 4, 4' provisioned at the third order-picking provisioning position 20.

In particular, the ordered goods 2 of the first order lines 6 may be mixed in the target loading aid 4, 4', even if the ordered goods 2 of the first order lines 6 are stored in the loading aids 11, or in storing zones in the first loading aids 11, in an article-specific manner.

Figure 5:
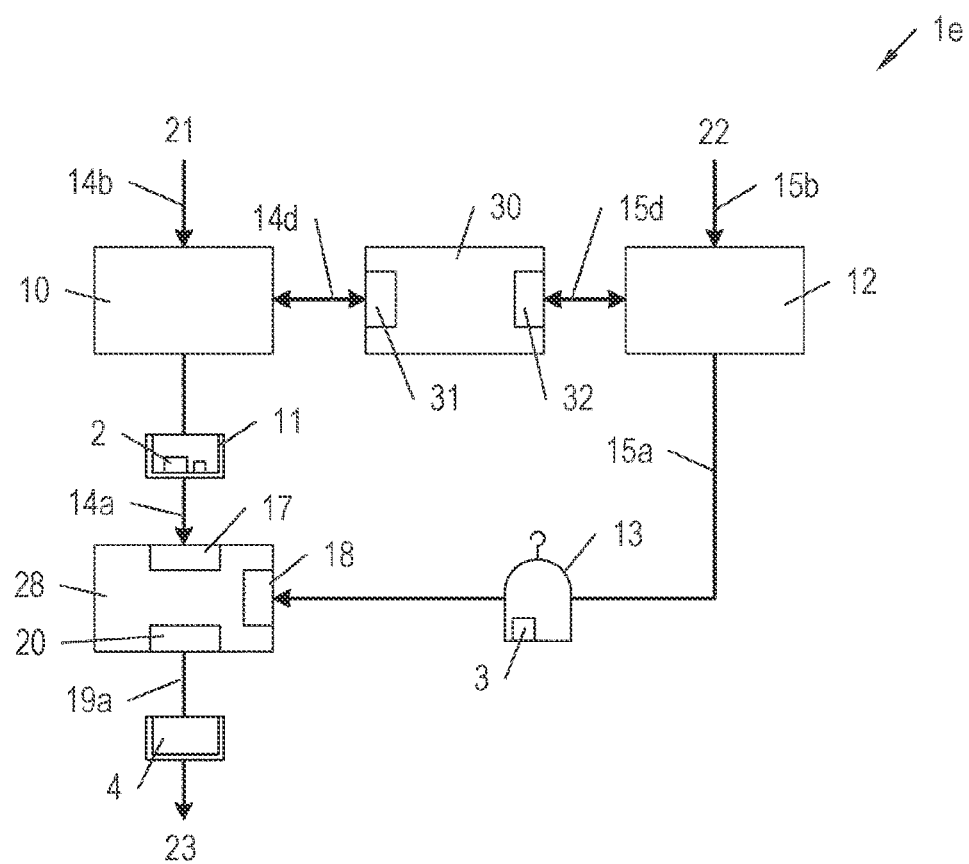
FIG. 5 another embodiment of a schematically-depicted storage and order-picking system having a storage reloading station between the first and second storage zones.

FIG. 5 shows a storage and order-picking system 1e, which is, again, very similar to the storage and order-picking system 1a depicted in FIG. 1. In contrast to the latter, the storage and order-picking system 1e comprises a fourth section 14d of the first conveying system and a fourth section 15d of the second conveying system, which connect the first storage zone 10 and the second storage zone 12 with each other. A storage reloading station 30 is arranged along the route of the fourth section 14d of the first conveying system and the fourth section 15d of the second conveying system. The storage reloading station 30 enables the reloading A) of (a) good(s) from the first storage zone 10 into a hanging bag 13 provisioned at the storage reloading station 30 and/or the reloading B) of (a) good(s) from the second storage zone 12 into or onto a first loading aid 11 provisioned at the storage reloading station 30.

To that end, the storage reloading station 30 comprises a first storage reloading provisioning position 31, to which the fourth section 14*d* of the first conveying system is coupled in order to provision the first loading aid 11 with the good(s) from the first storage zone 10, and a second storage reloading provisioning position 32, to which the fourth section 15*d* the second conveying system is coupled in order to provision the hanging bag 13.

In the case A), during the rearranging operation, a first loading aid 11 with a good(s) from the first storage zone 10 is retrieved, conveyed to the storage reloading station 30 and supplied at the first storage reloading provisioning position 31. Afterwards, the good(s) is/are loaded into a hanging bag 13, which is provisioned at the second storage reloading provisioning position 32. Then, the hanging bag 13 is conveyed into the second storage zone 12 and stored there. In the case B), during the rearranging operation, a hanging bag 13 with (a) good(s) from the second storage zone 12 is retrieved, conveyed to the storage reloading station 30 and supplied at the second storage reloading provisioning position 32. Afterwards, the good(s) is/are loaded into a first loading aid 11, which is provisioned at the first storage reloading provisioning position 31. Then, the first loading aid 11 is conveyed into the first storage zone 10 and stored there.

In FIG. 5, the order-processing computer 5 is not marked for better depictability. Yet, self-evidently, the former may be provided also in the storage and order-picking system 1*e* depicted in FIG. 5.

In the examples presented, the target loading aid 4, 4' functions as a dispatch loading aid and thus serves the outbound transport of the ordered good(s) 2 of the first order line 6 and the ordered good(s) 3 of the second order line 7 from the storage and order-picking system 1*a*. Generally, it is also conceivable in all variant embodiments that the first ordered good(s) 2 of the first order line 6 and/or the second ordered good(s) 3 of the second order line 7 is/are loaded into or onto an interim loading aid, before being reloaded into or onto the dispatch loading aid 4, 4'. Like the dispatch loading aid 4, 4', this interim loading aid may be configured in particular as a container, cardboard box, tray, pallet, bag (in particular a "polybag"), pouch, sack, hanging bag or shelf unit.

It should also be pointed out in this context that not all first loading aids 11, not all hanging bags 13 and not all target loading aids 4, 4' must respectively be configured identical, but within the respective categories different embodiments may be provided.

It is also advantageous if picking orders which comprise ordered goods 2 of the first order line 6 and ordered goods 3 of the second order line 7 are loaded into an interim loading aid, and picking orders which comprise only ordered goods 2 of the first order line 6 or only ordered goods 3 of the second order line 7 are loaded directly into a dispatch loading aid 4, 4'.

FIG. 6 shows an example of a first loading aid 11*c*, which is configured as a mobile shelf unit. The mobile shelf unit 11*c* comprises, in storage planes respectively located on top of one another, shelves, at least one receiving location 33, at which at least one good/ordered good 2 of at least one first order line 6 (not depicted), preferably a plurality of goods/ordered goods 2 of at least one first order line 6, can be placed. In addition, the mobile shelf unit 11*c* has feet 34. It can therefore be lifted and transported using, for example, a fork of a forklift or of an autonomous industrial truck (see FIG. 8). It would also be conceivable that the shelf unit 11*c* has rollers instead of the feet 34 in order to be able to transport it more easily. It would finally also be conceivable that the shelf unit depicted in FIG. 6 is not used as a mobile shelf unit 11*c*, but as a fixed-installation shelf unit in the first storage zone 10.

FIG. 7 shows an exemplary configuration with a bottom 35, feet 34 arranged at same, side walls 36 rising up laterally at the bottom 35 and an overhead storage conveyor and/or suspension rod 37 arranged between the side walls.

Due to the structure, the configuration depicted can therefore be lifted and transported using, for example, a fork of a forklift or of an autonomous industrial truck (see FIG. 8). The overhead storage conveyor/suspension rod 37 is therefore configured so as to be mobile and/or transportable. It would also be conceivable that the configuration has rollers instead of the feet 34 in order to be able to transport it more easily. It would finally also be conceivable that the configuration depicted in FIG. 7 is not mobile but is installed in a fixed manner in the second storage zone 12.

FIG. 8 shows a schematically depicted example of an autonomous industrial truck 38. The autonomous industrial truck 38 has an underframe 39, at which wheels 40, 41 are mounted so as to be rotatable. At least one of the wheels 40 is coupled with a drive 42 and at least one of the wheels 40 is steerable. According to the embodiment shown, both wheels 40 are coupled with the drive 42 and are driven by same, and both wheels 41 are steerable wheels. Yet the industrial truck 38 may also comprise only three wheels 40, 41, of which the wheels 40 are driven and the wheel 41 is steerable. In addition, the autonomous industrial truck 38 comprises a transport platform 43, on which the ordered goods 2, 3, goods, mobile shelf units 11*c* or mobile overhead storage conveyors 37 to be transported can be received temporarily. According to the embodiment shown, the transport platform 43 is readjustable relatively compared to the underframe 39. To that end, the autonomous industrial truck 38 may have a vertical guidance 44 with the vertically movable transport platform 43 affixed to it, as it is depicted in FIG. 8. The transport platform 43 may also be shiftable laterally and/or forward in order to be able to receive or put down ordered goods 2, 3, goods, mobile shelf units 11*c* or mobile overhead storage conveyors 37 more easily. Yet the transport platform 43 could also be a fixed, level surface at the autonomous industrial truck 38. Further, an autonomous industrial truck 38 also comprises a drive control 45 for receiving commands from a superordinate control 46 (which may be comprised, for example, by the order-processing computer) and for controlling/regulating the movements of the autonomous industrial truck 38. Finally, an autonomous industrial truck 38 comprises sensors 47*a*, 47*b* for capturing the environment of the autonomous industrial truck 38 and for spatial orientation. The autonomous industrial truck 38 depicted in FIG. 8 has steerable wheels 41. Yet these wheels will be obsolete to the extent that the autonomous industrial truck 38 has wheels using which also a lateral movement can be executed (e.g. Mecanum wheels). It would also be conceivable that, instead of a transport platform 43 or additionally to same, an overhead conveyor/suspension rod 37 is provided in order to retrieve ordered goods 3 from the second storage zone 12 and stored goods into the second storage zone 12.

FIG. 9 shows a storage and order-picking system 1f in a more detailed depiction. The storage and order-picking system 1f comprises a building 48, as well as a gate at the first goods acceptance zone 21 and a gate at the second goods acceptance zone 22.

There are three second sections 14*b*, 14*b*' and 14*b*" of the first conveying system in the area of the first goods acceptance zone 21. The second section 14*b* of the first conveying system connects the first goods acceptance zone 21 with a robot 49a. The second sections 14b' and 14b" of the first conveying system connect the robot 49a with the first storage zone 10, which comprises multiple storage racks 50 as well as storage and retrieval units 51a and 51b, which travel in rack aisles running between the storage racks 50. At the end of the rack aisles which faces the second sections 14b' and 14b" of the first conveying system, a first section 14a of the first conveying system is arranged, which is, in this example, configured circular and leads to another robot 49b. At the end of the first section 14a of the first conveying system, a first order-picking provisioning position 17 is arranged. In accordance with the embodiments described above, the first picking station 16 comprises the robot 49b, using which the picking process can be carried out automatically. Alternatively, the first picking station 16 may be provided for a human order picker, who can carry out the picking process in a manual (in particular computer-aided) manner.

In the area of the second goods acceptance zone 22, there are two second sections 15b and 15b' of the second conveying system, which connect the second goods acceptance zone 22 with the second storage zone 12. The second storage zone 12 comprises multiple fixed-installation overhead storage conveyors 52. At the lower end of the second storage zone 12, a first section 15a of the second conveying system is arranged, which equally leads to the robot 49b. A second order-picking provisioning position 18 is arranged at the end of the first section 15a of the second conveying system.

A third conveying system 19, which connects, in terms of conveyance, the robot system 49d to the goods transfer zone 23a, is/are also arranged in the operating range of the robot system 49d. A third order-picking provisioning position 20 is arranged at the starting point of the third conveying system 19.

Also multiple autonomous industrial trucks 38a . . . 38f may be located in the area of the storage and order-picking system 1f. Another first order-picking provisioning position 17' is finally arranged in the area of the travel surface of the autonomous industrial trucks 38a . . . 38f.

The functioning of the storage and order-picking system if depicted in FIG. 9 is as follows:

Goods 53a . . . 53d are delivered at the first goods acceptance zone 21, loaded onto the second section 14b of the first conveying system, reloaded from the second section 14b of the first conveying system onto the second sections 14b' and 14b" of the first conveying system by the robot system 48a, specifically reloaded into a first loading aid 11a, and stored into the storage racks 50 with the help of the storage and retrieval units 51a and 51b. As is apparent in FIG. 9, the goods 53a . . . 53d may be delivered separated or in delivery goods carriers 54. In the course of the storing process, the goods 53a . . . 53d can be separated, yet this is not mandatory. Also, the reloading into a first loading aid 11a is not mandatory, but it would also be conceivable to store the delivery goods carriers 54 directly into the first storage zone 10.

In an entirely similar way, goods are stored into the second storage zone 12. To that end, the goods are transferred from the second goods acceptance zone 22 onto the second sections 15b and 15b' of the second conveying system. The second sections 15b and 15b' of the second conveying system are configured as overhead transport conveyors and transport the goods into the second storage zone 12, where they are stored suspended on overhead storage conveyors 52.

When a picking order is to be processed, the first loading aids 11b with the ordered goods 2 of the first order line 6 allocated to the order are retrieved from at least one storage rack 50 with the help of at least one storage and retrieval unit 51a and 51b and transferred onto the first section 14a of the first conveying system. Then, the ordered goods 2 of the first order line 6 are transported to the robot 49b on the first section 14a of the first conveying system using the first loading aid 11b and supplied at the first order-picking provisioning position 17. Then, the ordered goods 2 of the first order line 6 are reloaded onto a target loading aid 4 by the robot 49b, which target loading aid 4 is supplied at the third order-picking provisioning position 20.

Further, according to said picking order, hanging bags 13 with the ordered goods 3 of the second order line 7 are retrieved from the second storage zone 12 and transported to the robot system 49b via the first section 15a of the second conveying system and supplied at the second order-picking provisioning position 18. Then, the ordered goods 3 of the second order line 7 are equally loaded into the target loading aid 4. Finally, the target loading aid 4 is conveyed to the first goods transfer zone 23a on the third conveying system 19.

With the help of the autonomous industrial trucks 38a . . . 38f, a third loading aid 11c of the first loading aids with ordered goods 2 of the first order line 6 may be transported to the robot 49b and supplied at the other first order-picking provisioning position 17', as it is depicted in FIG. 9 for the autonomous industrial truck 38f. Also these ordered goods 2 of the first order line 6 can be reloaded onto the target loading aid 4 by the robot 49b.

With the help of the autonomous industrial trucks 38a . . . 38f, also third ordered goods 55a, 55b can be transported to the second goods transfer zone 23b. In the depicted example, these third ordered goods 55a, 55b are directly received by the industrial truck 38a . . . 38f and/or the industrial trucks 38a . . . 38f at the first goods acceptance zone 21 or second goods acceptance zone 22 (and not removed from the first storage zone 10 or the second storage zone 12). In the example shown, these third ordered goods 55a, 55b therefore form so-called "cross-docking goods."

In particular, the second goods transfer zone 23b for the picking of ordered goods 55a, 55b may be provided for the intermediate trade or end sellers ("retail") and the first goods transfer zone 23a for the picking of ordered goods 2, 3 may be provided for the end customer ("ecommerce"). It is further conceivable that the storage and order-picking system if also has different picking stations 16 especially tailored to the needs of the intermediate trade/end seller and the end customer, which picking stations 16 are coupled to the first storage zone 10 via the first conveying system and/or to the second storage zone 12 via the second conveying system. Orders by the intermediate trade/end seller are comprehensive and often contain many ordered goods 2, 3 of the same type of good 8, whereas orders by the end customers are less comprehensive and contain few ordered goods 2, 3 of the same type of good 8.

Yet, self-evidently, it would also be possible that the autonomous industrial trucks 38a . . . 38f are used for storing goods into the first storage zone 10 or the second storage zone 12 and/or for retrieving ordered goods 2 of the first order line 6 from the first storage zone 10 or ordered goods 3 of the second order line 7 from the second storage zone 12. The first storage zone 10 and/or the second storage zone 12 is/are/can then be equipped with adequate transfer stations (not depicted), which enable the transfer of first loading aids 11 to the first storage zone 10, the transfer of second loading aids 13 to the second storage zone 12, the acceptance of first loading aids 11 from the first storage zone 10 or the acceptance of second loading aids 13 from the second storage zone 12.

Yet it would also be conceivable that the autonomous industrial trucks 38a . . . 38f can directly access the first storage zone 10 and/or the second storage zone 12. For example, the autonomous industrial trucks 38a . . . 38f, instead of the storage and retrieval units 51a and 51b, could travel in the rack aisles between the shelf units 50 and store goods into the shelf units 50 and retrieve ordered goods 2 of the first order line 6 from the shelf units 50. In a similar way, the autonomous industrial trucks 38a . . . 38f could also store goods into the overhead storage conveyors 52 and retrieve ordered goods 3 of the second order line 7 from the overhead storage conveyors 52.

The first conveying system 14a, 14b, 14b', 14b" and/or the second conveying system 15a, 15b, 15b' may comprise only fixed-installation conveying device(s), only autonomous industrial trucks 38a . . . 38f, or have a mixed structure, i.e. comprise both fixed-installation conveying device(s) and autonomous industrial trucks 38a . . . 38f.

The formation and configuration of the first conveying system 14a, 14b, 14b', 14b" and second conveying system 15a, 15b, 15b' in FIG. 9 is to be seen as only illustrative, and also other forms and configurations of the first conveying system 14a, 14b, 14b', 14b" and second conveying system 15a, 15b, 15b' are conceivable. In particular, a circular conveyor line could be arranged also at the first goods acceptance zone 21, or linear conveyor lines could be provided at the first goods transfer zone 23.

It should also be noted in this context that the robots 49a and 49b do not necessarily have to be designed as jointed-arm robots, but can also be designed as gantry robots, for example. It should further be noted that the sequences of movement automatically carried out by a robot 49a, 49b may, in principle, also be carried out by a worker, and thus in a manual, in particular computer-aided, manner. The robot 49a, 49b will then be obsolete. Also a mixed manual/automatic operation would be conceivable.

The storage and order-picking system if depicted in FIG. 9 comprises a picking station 16 (for example having a robot 49b), to which the first section 14a of the first conveying system is coupled in order to provision the first loading aid 11b with the ordered good 2 of the first order line 6, and to which the first section 15a of the second conveying system is coupled in order to provision the hanging bag 13 with the ordered good 3 of the second order line 7.

The storage and order-picking system if depicted in FIG. 9 is therefore structurally very similar to the storage and order-picking system 1a depicted in FIG. 1.

Yet, self-evidently, the technical teaching disclosed in FIG. 9 also applies in an unlimited manner to the storage and order-picking systems 1b . . . 1e depicted in FIGS. 2 to 5. In particular, the storage and order-picking system if depicted in FIG. 9 may also have a sorting device 24 and/or a reloading station 25 and/or a second picking station 28 and/or a storage reloading station 30. It should further be noted that the order-processing computer 5 is not explicitly depicted in FIG. 9, yet may self-evidently also form part of the storage and order-picking system 1f.

It should be noted in addition that, while reference is made to hanging bags 13 in the examples shown, also suspended carriers with hanging articles may be stored and transported in the second storage zone 12 and by the second conveying system 15a . . . 15d.

The ordered goods 2 of the first order line 6 and the ordered goods 3 of the second order line 7 may generally be loaded into the target loading aid 4 simultaneously or in a random sequence, one after the other. Also conceivable is in particular a variant in which a hanging bag 13 with the ordered good(s) 3 of the second order line 7 is first retrieved, and a retrieval of the first loading aid 11b is only triggered once the hanging bag 13 with the ordered good(s) 3 of the second order line 7, on its way to the picking station 16, passes a reporting point (for example in the form of a sensor mechanism). This reporting point may thus be located in FIG. 9 along the route of the first section 15a of the second conveying system, for example. In particular, the reporting point may be located along the route of the first section 15a of the second conveying system downstream of a sorting device 24 (compare FIG. 2). Yet said reporting point may also be located along the route of the third section 14c of the first conveying system, when a reloading station 25 is provided (compare FIG. 3), or along the route of the first section 19a of the third conveying system, when a first picking station 16 and a second picking station 28 is provided (compare FIG. 4).

It should finally be noted that the scope of protection is determined by the patent claims. However, the description and the drawings are to be adduced for construing the claims. Individual features or feature combinations from the different exemplary embodiments shown and described may represent independent inventive solutions. The object underlying the independent inventive solutions may be gathered from the description.

In particular, it should be noted that the depicted devices may in reality also include more or fewer parts than depicted. The depicted devices and/or their parts may partially not be depicted to scale and/or are enlarged and/or are reduced in size.

LIST OF REFERENCE NUMBERS

1a . . . 1f storage and order-picking system
2 ordered good(s) of the first order line
3 ordered good(s) of the second order line
4, 4' target loading aid
5 order-processing computer
6 first order line
7 second order line
8 type of good
9 number of goods to be picked
10 first storage zone
11, 11a . . . 11c first loading aid
12 second storage zone
13 second loading aid/hanging bag
14a . . . 14d section of the first conveying system
15a . . . 15d section of the second conveying system
16 (first) picking station
17, 17' first order-picking provisioning position
18 second order-picking provisioning position
19, 19a, 19b third conveying system
20 third order-picking provisioning position
21 first goods acceptance zone
22 second goods acceptance zone
23, 23a . . . 23b goods transfer zone
24 sorting device
25 reloading station
26 first reloading provisioning position
27 second reloading provisioning position
28 second picking station
29 fourth order-picking provisioning position
30 storage reloading station
31 first storage reloading provisioning position 32 second storage reloading provisioning position
33 receiving location/storage location
34 foot
35 bottom
36 side wall
37 mobile overhead storage conveyor/suspension rod
38, 38a . . . 38f autonomous industrial truck
39 underframe
40 wheel (driven)
41 wheel (steerable)
42 drive
43 transport platform
44 vertical guidance
45 drive control
46 control
47a, 47b sensor
48 building
49a, 49b robot
50 storage rack
51a, 51b storage and retrieval unit
52 fixed-installation overhead storage conveyor
53a . . . 53d good(s)
54 delivery goods carriers
55a, 55b third ordered goods
A joining point

The invention claimed is:

1. A storage and order-picking system for picking ordered goods into or onto target loading aids, the storage and order-picking system comprising:
an order-processing computer for receiving an order of goods to be picked and for ascertaining the goods required for the order, wherein the goods associated with the order are ordered goods and wherein the order comprises a first order line which specifies a first ordered good to be picked and a quantity of the first ordered good to be picked and a second order line which specifies a second ordered good to be picked and a quantity of the second ordered good to be picked,
a first storage zone,
a plurality of first loading aids disposed in the first storage zone, wherein the plurality of first loading aids are different from hanging bags and wherein an ordered good corresponding to the first order line is stored in or on a first loading aid of the plurality of first loading aids,
a second storage zone,
a plurality of hanging bags disposed in the second storage zone, wherein an ordered good corresponding to the second order line is stored in a hanging bag of the plurality of hanging bags,
a first conveying system configured to retrieve the first loading aid storing the ordered good of the first order line from the first storage zone,
a second conveying system configured to retrieve the hanging bag storing the ordered good of the second order line from the second storage zone,
a picking station,
wherein the first conveying system is further configured to transport the first loading aid storing the ordered good of the first order line to the picking station and/or the second conveying system is further configured to transport the hanging bag storing the ordered good of the second order line to the picking station, and
wherein the picking station is configured to pick the ordered good of the first order line and the ordered good of the second order line and to load the ordered good of the first order line and the ordered good of the second order line into or onto a target loading aid provided at the picking station.

2. The storage and order-picking system according to claim 1, wherein the picking station comprises:
a first order-picking provisioning position cooperating with the first conveying system and the first order-picking provisioning position is configured to provide the first loading aid of the plurality of first loading aids storing the ordered good of the first order line, and
a second order-picking provisioning position cooperating with the second conveying system and the second order-picking provisioning position is configured to provide the hanging bag of the plurality of hanging bags storing the ordered good of the second order line.

3. The storage and order-picking system according to claim 2, further comprising:
a third conveying system configured to transport the target loading aid to the picking station,
wherein the picking station further comprises a third order-picking provisioning position cooperating with the third conveying system and the third order-picking provisioning position is configured to provide the target loading aid.

4. The storage and order-picking system according to claim 1, further comprising:
a further hanging bag of the plurality of hanging bags, disposed in the second storage zone and used for transporting the good of the first order line, and
a reloading station, wherein the reloading station comprises:
a first reloading provisioning position cooperating with the first conveying system and the first reloading provisioning position is configured to provide the first loading aid of the plurality of first loading aids storing the ordered good of the first order line, and
a second reloading provisioning position cooperating with the second conveying system and the second reloading provisioning position is configured to provide the further hanging bag of the plurality of hanging bags,
wherein the reloading station is configured to reload the ordered good of the first order line into the further hanging bag of the plurality of hanging bags,
wherein the second conveying system is further configured to transport the hanging bag of the plurality of hanging bags storing the ordered good of the second order line and the further hanging bag of the plurality of hanging bags storing the ordered good of the first order line to the picking station, and
wherein the picking station cooperates with the second conveying system and the picking station is configured to pick the ordered good of the first order line and the ordered good of the second order line and to load the ordered good of the first order line and the ordered good of the second order line into or onto the target loading aid provided at the picking station.

5. The storage and order-picking system according to claim 4, further comprising:
a third conveying system configured to transport the target loading aid to the picking station,
wherein the picking station further comprises a third order-picking provisioning position cooperating with the third conveying system and the third order-picking provisioning position is configured to provide the target loading aid.

6. The storage and order-picking system according to claim 1, further comprising:
- a further first loading aid of the plurality of first loading aids, disposed in the first storage zone and used for transporting the good of the second order line, and
- a reloading station, wherein the reloading station comprises:
- a first reloading provisioning position cooperating with the second conveying system and the first reloading provisioning position is configured to provide the hanging bag of the plurality of hanging bags storing the ordered good of the second order line, and
- a second reloading provisioning position cooperating with the first conveying system and the second reloading provisioning position is configured to provide the further first loading aid of the plurality of first loading aids,
- wherein the reloading station is configured to reload the ordered good of the second order line into or onto the further first loading aid of the plurality of first loading aids,
- wherein the first conveying system is further configured to transport the first loading aid of the plurality of first loading aids storing the ordered good of the first order line and the further first loading aid of the plurality of first loading aids storing the ordered good of the second order line to the picking station, and
- wherein the picking station cooperates with the first conveying system and the picking station is configured to pick the ordered good of the first order line and the ordered good of the second order line and to load the ordered good of the first order line and the ordered good of the second order line into or onto the target loading aid provided at the picking station.

7. The storage and order-picking system according to claim 6 further comprising:
- a third conveying system configured to transport the target loading aid to the picking station,
- wherein the picking station further comprises a third order-picking provisioning position cooperating with the third conveying system and the third order-picking provisioning position is configured to provide the target loading aid.

8. The storage and order-picking system according to claim 1, wherein the picking station comprises a first picking station and a second picking station, and further comprises a third conveying system configured to transport the target loading aid to the first picking station and the second picking station,
- wherein the first picking station comprises:
- an order-picking provisioning position cooperating with the first conveying system and the order-picking provisioning position cooperating with the first conveying system is configured to provide the first loading aid of the plurality of first loading aids storing the ordered good of the first order line, and
- an order-picking provisioning position cooperating with the third conveying system and the order-picking provisioning position cooperating with the third conveying system is configured to provide the target loading aid, and is configured to pick the ordered good of the first order line and to load the ordered good of the first order line into or onto the target loading aid provided at the first picking station,
- wherein the second picking station comprises:
- an order-picking provisioning position cooperating with the second conveying system and the order-picking provisioning position cooperating with the second conveying system is configured to provide the hanging bag of the plurality of hanging bags storing the ordered good of the second order line, and
- an order-picking provisioning position cooperating with the third conveying system and the order-picking provisioning position cooperating with the third conveying system is configured to provide the target loading aid, and is configured to pick the ordered good of the second order line and to load the ordered good of the second order line into or onto the target loading aid provided at the second picking station.

9. The storage and order-picking system according to claim 1, wherein the picking station comprises a first picking station and a second picking station, and further comprises a third conveying system configured to transport the target loading aid to the first picking station and the second picking station,
- wherein the first picking station comprises:
- an order-picking provisioning position cooperating with the second conveying system and the order-picking provisioning position cooperating with the second conveying system is configured to provide the hanging bag of the plurality of hanging bags storing the ordered good of the second order line, and
- an order-picking provisioning position cooperating with the third conveying system and the order-picking provisioning position cooperating with the third conveying system is configured to provide the target loading aid, and is configured to pick the ordered good of the second order line and to load the ordered good of the second order line into or onto the target loading aid provided at the first picking station, and
- wherein the second picking station comprises:
- an order-picking provisioning position cooperating with the first conveying system and the order-picking provisioning position cooperating with the first conveying system is configured to provide the first loading aid of the plurality of first loading aids storing the ordered good of the first order line, and
- an order-picking provisioning position cooperating with the third conveying system and the order-picking provisioning position cooperating with the third conveying system is configured to provide the target loading aid, and is configured to pick the ordered good of the first order line and to load the ordered good of the first order line into or onto the target loading aid provided at the second picking station.

10. The storage and order-picking system according to claim 1, wherein the first conveying system and the second conveying system connect the first storage zone and the second storage zone with each other, and further comprising a storage reloading station,
- wherein the storage reloading station comprises:
- a first storage reloading provisioning position cooperating with the first conveying system and the first storage reloading provisioning position is configured to provide a first loading aid storing a good from the first storage zone, and
- a second storage reloading provisioning position cooperating with the second conveying system and the second storage reloading provisioning position is configured to provide a hanging bag,
- and is configured to reload the good of the first storage zone into the hanging bag provided at the storage reloading station.

11. The storage and order-picking system according to claim 1, wherein the first conveying system and the second conveying system connect the first storage zone and the second storage zone with each other, and further comprising a storage reloading station, wherein the storage reloading station comprises:

a first storage reloading provisioning position cooperating with the first conveying system and the first storage reloading provisioning position is configured to provide a first loading aid, and a second storage reloading provisioning position cooperating with the second conveying system and the second storage reloading provisioning position is configured to provide a hanging bag storing a good from the second storage zone, and is configured to reload the good of the second storage zone into or onto the first loading aid provided at the storage reloading station.

12. The storage and order-picking system according to claim 1, wherein at least one of:

predominantly or exclusively new goods are stored in the first storage zone, predominantly or exclusively slow-moving goods are stored in the first storage zone, and goods in the first storage zone are stored in a first loading aid in an article-specific manner.

13. The storage and order-picking system according to claim 1, wherein at least one of:

predominantly or exclusively return goods are stored in the second storage zone, predominantly or exclusively fast-moving goods are stored in the second storage zone, and goods in the second storage zone are stored in a hanging bag in a mixed manner.

14. The storage and order-picking system according to claim 1, wherein the first loading aid is selected from the group consisting of a container, a tray and a cardboard box, wherein the first loading aid comprises:

a bottom with a receiving location on an upper side, onto which at least one good of the first order line is placed, and a transport surface on a lower side, by which the first loading aid is transportable on the first conveying system, and side walls rising up from the bottom.

15. The storage and order-picking system according to claim 1, wherein the first loading aid is a mobile shelf unit having, in storage planes located on top of one another, shelves with respectively at least one receiving location, at which the ordered good of the first order line can be placed.

16. The storage and order-picking system according to claim 1, further comprising:

a sorting device cooperating with at least one of the first conveying system and the second conveying system and the sorting device is configured to bring at least one of ordered goods of the first order lines and ordered goods of the second order lines into a sequence.

17. The storage and order-picking system according to claim 1, wherein at least one of the first conveying system and the second conveying system comprises at least one of a fixed-installation conveying device and an autonomous industrial truck.

18. The storage and order-picking system according to claim 1, wherein the first storage zone comprises storage racks, storage locations are provided in the storage racks, and the first conveying system comprises an automated conveying vehicle configured to retrieve the first loading aid storing the ordered good of the first order line.

19. The storage and order-picking system according to claim 18, wherein the automated conveying vehicle:

is displaceable in front of the storage locations along a rack aisle, is equipped with a load handling device configured to transport the first loading aid between a storage location of the storage locations and the automated conveying vehicle, and is configured as at least one of a rail guided automated storage and retrieval unit and an autonomous industrial truck.

20. The storage and order-picking system according to claim 1, wherein:

the first loading aid has a mobile shelf unit, and the first conveying system has an autonomous industrial truck configured to transport the mobile shelf unit.

21. The storage and order-picking system according to claim 1, wherein:

the second storage zone has overhead storage conveyors, and the second conveying system has overhead transport conveyors connected to the overhead storage conveyors and the second conveying system is configured to retrieve the hanging bag storing the ordered good of the second order line.

22. The storage and order-picking system according to claim 1, wherein:

the second storage zone has overhead storage conveyors, and the second conveying system has an automated conveying vehicle configured to retrieve the hanging bag storing the ordered good of the second order line.

23. An order-picking method for picking ordered goods into or onto a target loading aid, comprising the steps of:

receiving an order of goods to be picked and ascertaining the goods required for the order, wherein the goods associated with the order are ordered goods and wherein the order comprises a first order line which specifies a first ordered good to be picked and a quantity of the first ordered good to be picked and a second order line which specifies a second ordered good to be picked and a quantity of the second ordered good to be picked, providing a first storage zone, providing a plurality of first loading aids in the first storage zone, a first loading aid of the plurality of first loading aids storing an ordered good corresponding to the first order line, wherein each of the plurality of first loading aids are configured to be different from hanging bags, providing a second storage zone, providing a plurality of hanging bags in the second storage zone, a hanging bag of the plurality of hanging bags storing an ordered good corresponding to the second order line, retrieving the first loading aid storing the ordered good of the first order line from the first storage zone and retrieving the hanging bag storing the ordered good of the second order line from the second storage zone, and loading the ordered good of the first order line and the ordered good of the second order line into or onto the target loading aid in accordance with the order.

24. The order-picking method according to claim 23, further comprising the steps of:
- providing a picking station,
- transporting the first loading aid storing the ordered good of the first order line and the hanging bag storing the ordered good of the second order line to the picking station,
- providing the first loading aid storing the ordered good of the first order line and the hanging bag storing the ordered good of the second order line at the picking station,
- providing the target loading aid at the picking station, and
- loading the ordered good of the first order line and the ordered good of the second order line into or onto the target loading aid.

25. The order-picking method according to claim 23, further comprising the steps of:
- providing a reloading station,
- providing a picking station,
- providing a further hanging bag of the plurality of hanging bags disposed in the second storage zone and used for transporting the good of the first order line,
- transporting the first loading aid of the plurality of first loading aids storing the ordered good of the first order line to the reloading station,
- transporting the further hanging bag of the plurality of hanging bags to the reloading station,
- reloading the ordered good of the first order line into the further hanging bag of the plurality of hanging bags at the reloading station,
- transporting the hanging bag of the plurality of hanging bags storing the ordered good of the second order line to the picking station,
- after reloading, transporting the further hanging bag of the plurality of hanging bags storing the ordered good of the first order line from the reloading station to the picking station, and
- loading the ordered good of the first order line and the ordered good of the second order line into or onto the target loading aid at the picking station.

26. The order-picking method according to claim 23, further comprising the steps of:
- providing a reloading station,
- providing a picking station,
- providing a further first loading aid of the plurality of first loading aids disposed in the first storage zone and used for transporting the good of the second order line,
- transporting the hanging bag of the plurality of hanging bags storing the ordered good of the second order line to the reloading station,
- transporting the further first loading aid of the plurality of first loading aids to the reloading station,
- reloading the ordered good of the second order line into or onto the further first loading aid of the plurality of first loading aids at the reloading station,
- transporting the first loading aid of the plurality of first loading aids storing the ordered good of the first order line to the picking station,
- after reloading, transporting the further first loading aid of the plurality of first loading aids storing the ordered good of the second order line from the reloading station to the picking station, and
- loading the ordered good of the first order line and the ordered good of the second order line into or onto the target loading aid at the picking station.

27. The order-picking method according to claim 23, further comprising the steps of:
- providing a first picking station,
- providing a second picking station,
- transporting the first loading aid of the plurality of first loading aids storing the ordered good of the first order line to the first picking station,
- providing the target loading aid at the first picking station,
- loading the ordered good of the first order line into or onto the target loading aid at the first picking station,
- transporting the hanging bag of the plurality of hanging bags storing the ordered good of the second order line to the second picking station,
- after loading at the first picking station, transporting the target loading aid storing the ordered good of the first order line from the first picking station to the second picking station, and
- loading the ordered good of the second order line into or onto the target loading aid at the second picking station.

28. The order-picking method according to claim 23, further comprising the steps of:
- providing a first picking station,
- providing a second picking station,
- transporting the hanging bag of the plurality of hanging bags storing the ordered good of the second order line to the first picking station,
- providing the target loading aid at the first picking station,
- loading the ordered good of the second order line into or onto the target loading aid at the first picking station,
- transporting the first loading aid the of the plurality of first loading aids storing the ordered good of the first order line to the second picking station,
- after loading at the first picking station, transporting the target loading aid storing the ordered good of the second order line from the first picking station to the second picking station, and
- loading the ordered good of the first order line into or onto the target loading aid at the second picking station.

29. The order-picking method according to claim 23, wherein the target loading aid
- is used as a dispatch loading aid and at least one of the ordered good of the first order line and the ordered good of the second order line is loaded directly into or onto the dispatch loading aid, or
- is used as an interim loading aid and at least one of the ordered good of the first order line and the ordered good of the second order line is loaded into or onto the interim loading aid and then reloaded into or onto a dispatch loading aid.

30. The order-picking method according to claim 23, further comprising the steps of:
- providing a storage reloading station,
- providing a first loading aid of the plurality of first loading aids storing a good in the first storage zone,
- retrieving the first loading aid storing the good from the first storage zone,
- transporting the first loading aid storing the good from the first storage zone to the storage reloading station,
- providing a hanging bag of the plurality of hanging bags in the second storage zone,
- retrieving the hanging bag from the second storage zone,
- transporting the hanging bag from the second storage zone to the storage reloading station,
- reloading the good from the first loading aid into the hanging bag at the storage reloading station,
- after reloading, transporting the hanging bag storing the good from the storage reloading station to the second storage zone, and storing the hanging bag storing the good in the second storage zone.

31. The order-picking method according to claim 23, further comprising the steps of:
providing a storage reloading station,
providing a hanging bag of the plurality of hanging bags storing a good in the second storage zone,
retrieving the hanging bag storing the good from the second storage zone,
transporting the hanging bag storing the good from the second storage zone to the storage reloading station,
providing a first loading aid of the plurality of first loading aids in the first storage zone,
retrieving the first loading aid from the first storage zone,
transporting the first loading aid from the first storage zone to the storage reloading station,
reloading the good from the hanging bag into the first loading aid at the storage reloading station,
after reloading, transporting the first loading aid storing the good from the storage reloading station to the first storage zone, and
storing the first loading aid storing the good in the first storage zone.

32. The order-picking method according to claim 23, wherein the first loading aid stores a plurality of goods and an ordered good of the first order line is a good included in the plurality of goods.

33. The order-picking method according to claim 23, wherein the hanging bag stores exactly one good and an ordered good of the second order line correspond to the exactly one good.

34. The order-picking method according to claim 24, wherein the hanging bag stores a plurality of goods and an ordered good of the second order line is a good included in the plurality of goods.

* * * * *

UNITED STATES PATENT AND TRADEMARK OFFICE
CERTIFICATE OF CORRECTION

| | | |
|---|---|---|
| PATENT NO. | : 12,030,721 B2 | Page 1 of 1 |
| APPLICATION NO. | : 16/973244 | |
| DATED | : July 9, 2024 | |
| INVENTOR(S) | : Timothy Lindley | |

It is certified that error appears in the above-identified patent and that said Letters Patent is hereby corrected as shown below:

On the Title Page

Item [54], and in the Specification, Column 1 Line 1 In the title, please change: "STORAGE AND ORDER PICKING SYSTEM AND METHOD FOR PICKING ORDERED ARTICLES FROM A HANGING BAG AND ANOTHER LOADING AID" to correctly read: -- STORAGE AND ORDER-PICKING SYSTEM AND METHOD FOR PICKING ORDERED GOODS FROM A HANGING BAG AND ANOTHER LOADING AID --

Signed and Sealed this
Sixth Day of August, 2024

Katherine Kelly Vidal
*Director of the United States Patent and Trademark Office*